United States Patent
Kanemoto et al.

(10) Patent No.: US 9,846,442 B2
(45) Date of Patent: Dec. 19, 2017

(54) FUNCTIONAL ELEMENT, ELECTRONIC DEVICE, ELECTRONIC APPARATUS, AND MOVING OBJECT

(71) Applicant: Seiko Epson Corporation, Tokyo (JP)

(72) Inventors: Kei Kanemoto, Suwa (JP); Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 325 days.

(21) Appl. No.: 14/606,370

(22) Filed: Jan. 27, 2015

(65) Prior Publication Data

US 2015/0212526 A1    Jul. 30, 2015

(30) Foreign Application Priority Data

Jan. 28, 2014 (JP) .................................. 2014-013064

(51) Int. Cl.
| | |
|---|---|
| G05B 21/00 | (2006.01) |
| G05B 13/00 | (2006.01) |
| G05D 15/00 | (2006.01) |
| G05D 19/02 | (2006.01) |

(52) U.S. Cl.
CPC ......... G05D 19/02 (2013.01); *H04M 2250/00* (2013.01)

(58) Field of Classification Search
CPC ........................... G05D 19/02; H04M 2250/00
USPC ........................................................ 700/280
See application file for complete search history.

(56) References Cited

U.S. PATENT DOCUMENTS

| | | | |
|---|---|---|---|
| 7,377,167 B2 * | 5/2008 | Acar .................. | G01C 19/5719 73/504.12 |
| 8,539,832 B2 | 9/2013 | Potasek et al. | |
| 8,739,627 B2 | 6/2014 | Li et al. | |
| 2003/0110858 A1 | 6/2003 | Kim et al. | |
| 2009/0205423 A1 | 8/2009 | Takagi et al. | |
| 2009/0320593 A1 * | 12/2009 | Nakashio ........... | G01C 19/5663 73/504.15 |
| 2011/0271760 A1 * | 11/2011 | Ohkoshi ................ | G01P 15/02 73/504.12 |
| 2012/0216613 A1 * | 8/2012 | Honda ............... | G01C 19/5747 73/504.15 |
| 2012/0256307 A1 * | 10/2012 | Koyama ............ | G01C 19/5783 257/693 |

(Continued)

FOREIGN PATENT DOCUMENTS

| | | |
|---|---|---|
| JP | 2003-194545 A | 7/2003 |
| JP | 2005-249784 A | 9/2005 |
| JP | 2006-153514 A | 6/2006 |

(Continued)

*Primary Examiner* — Ziaul Karim
(74) *Attorney, Agent, or Firm* — Harness, Dickey & Pierce, P.L.C.

(57) ABSTRACT

There is provided a functional element capable of preventing an oblique vibration due to a vibration leakage phenomenon from propagating to degrade the detection accuracy. A gyro element as the functional element includes a support body, a detection section, a drive coupling section having a first part and a second part, and a mass section connected to the drive coupling section, and connected to the support body via the drive coupling section, and the mass section performs the drive vibration in a direction along a third axis parallel to a normal line of a plane including the first axis and the second axis perpendicular to each other.

20 Claims, 16 Drawing Sheets

(56) References Cited

U.S. PATENT DOCUMENTS

2013/0276536 A1    10/2013   Kanemoto
2014/0000367 A1     1/2014   Potasek et al.

FOREIGN PATENT DOCUMENTS

| JP | 2008-014727 A | 1/2008 |
| --- | --- | --- |
| JP | 2009-175080 A | 8/2009 |
| JP | 2009-198206 A | 9/2009 |
| JP | 2012-083112 A | 4/2012 |
| JP | 2012-108114 A | 6/2012 |
| JP | 2013-092525 A | 5/2013 |
| JP | 2013-125006 A | 6/2013 |
| JP | 2013-221919 A | 10/2013 |

\* cited by examiner

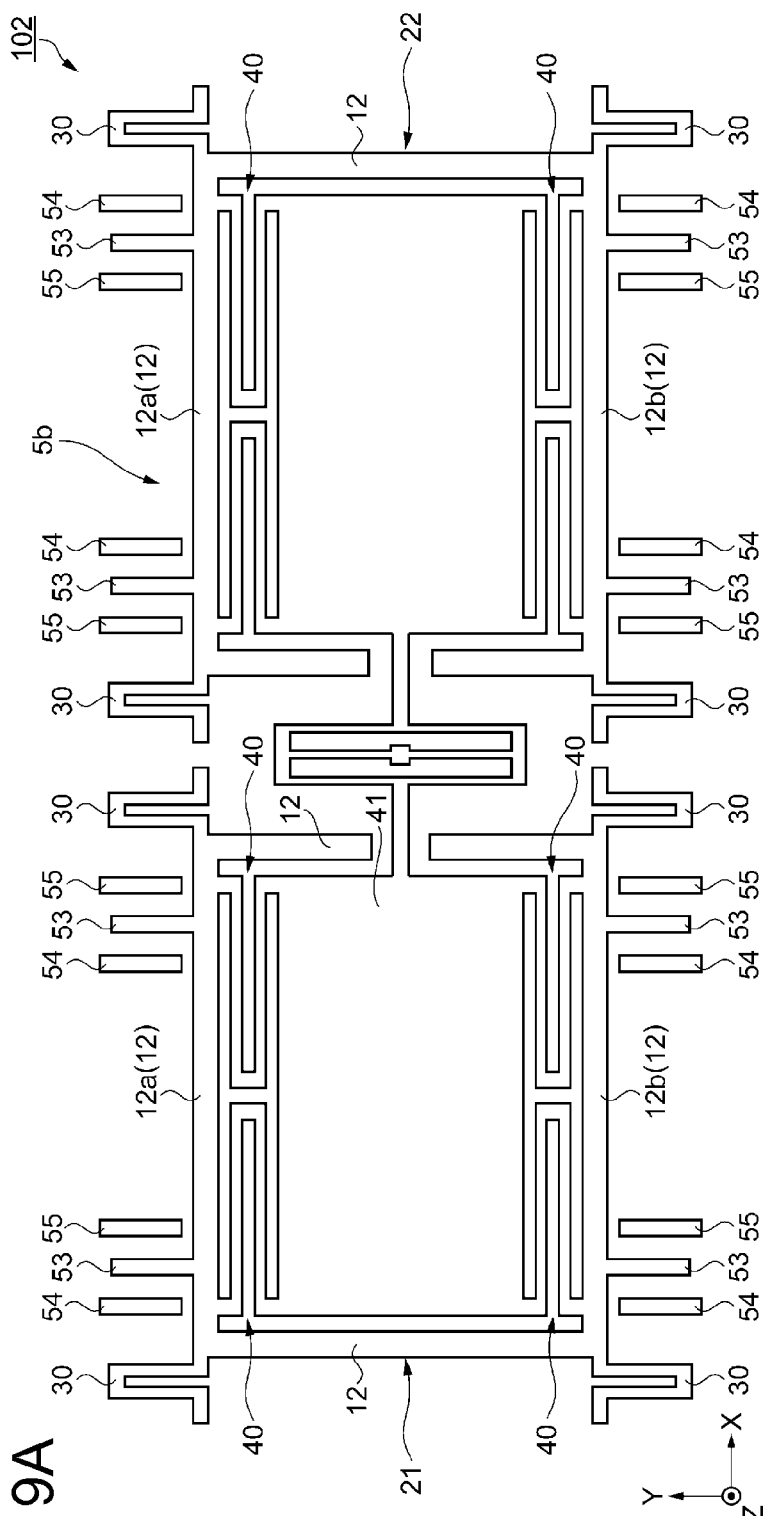
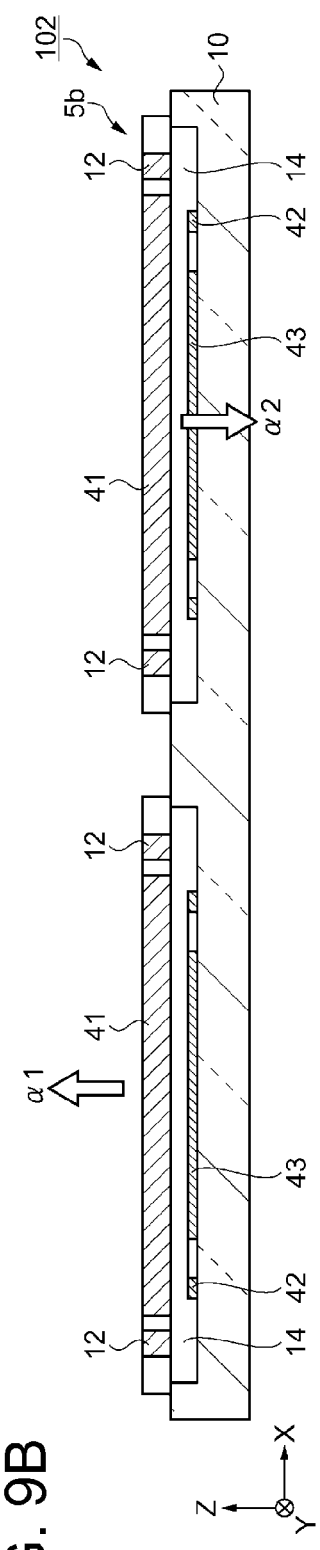
FIG. 9A
FIG. 9B

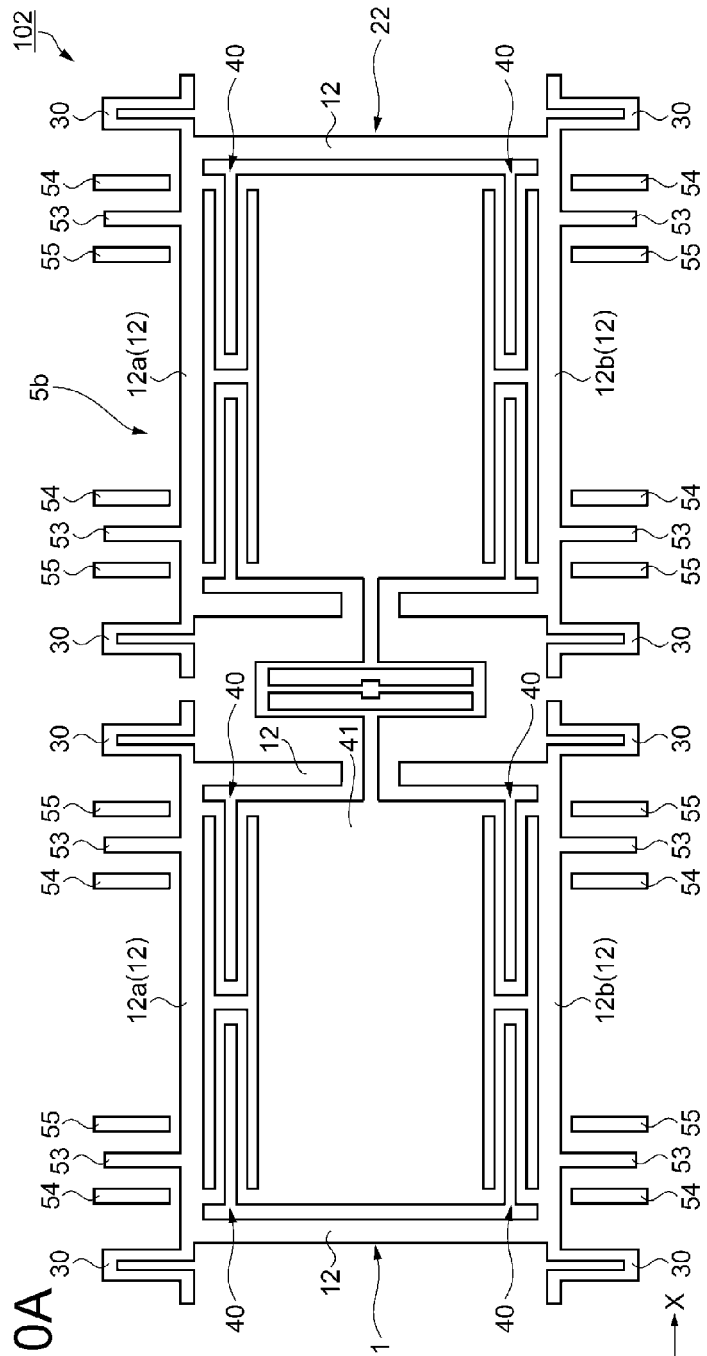
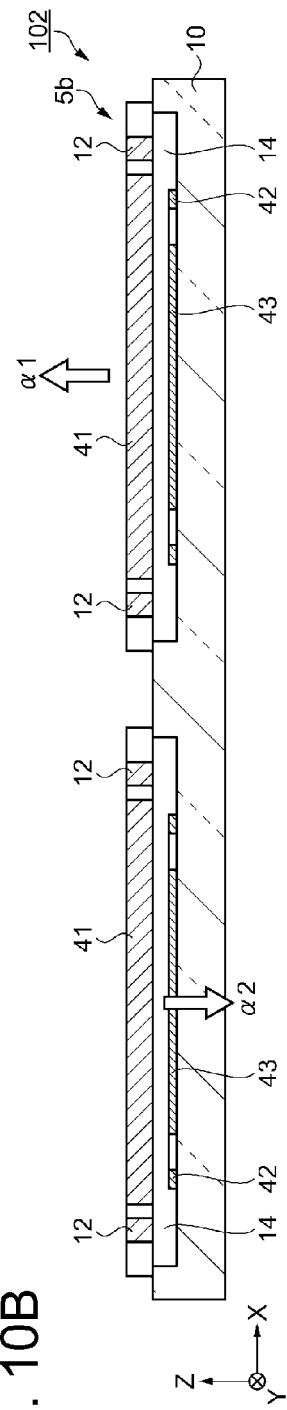
FIG. 10A
FIG. 10B

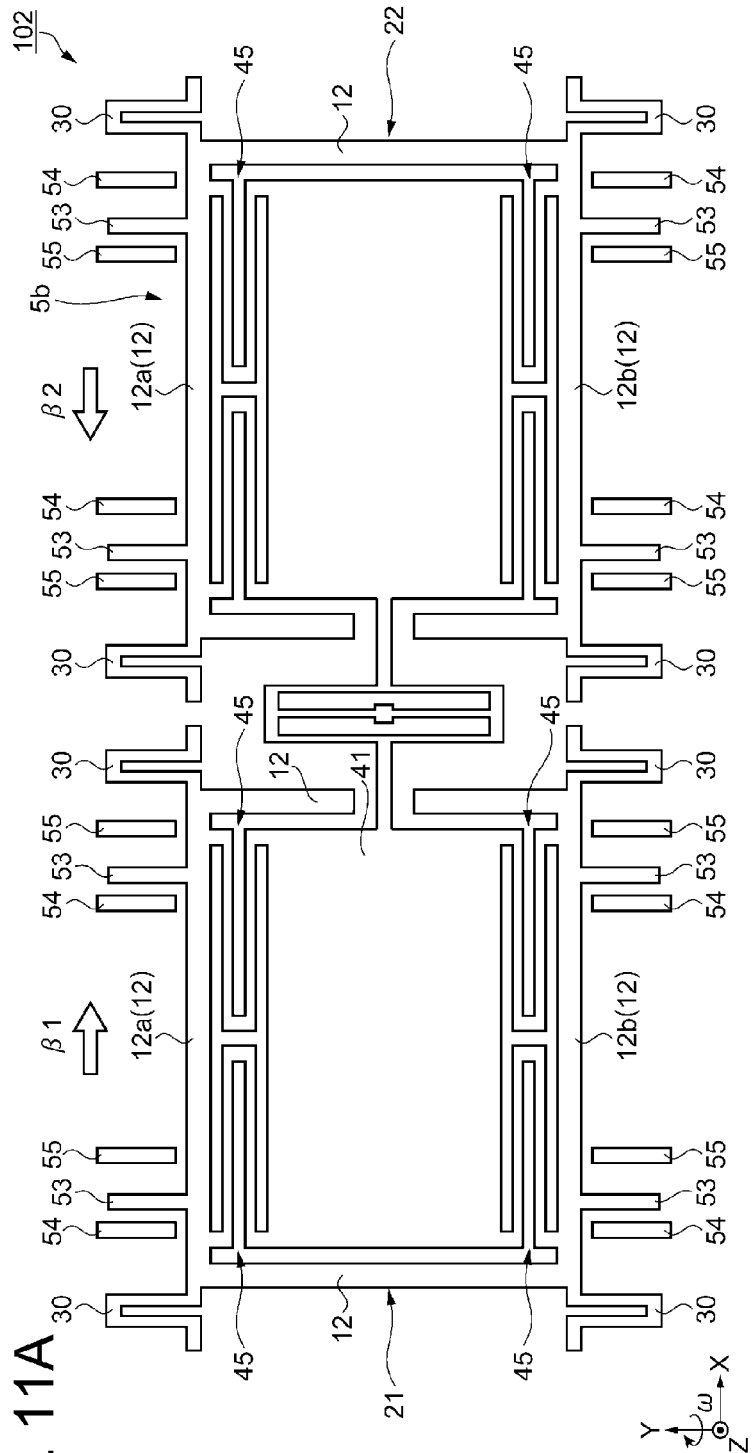
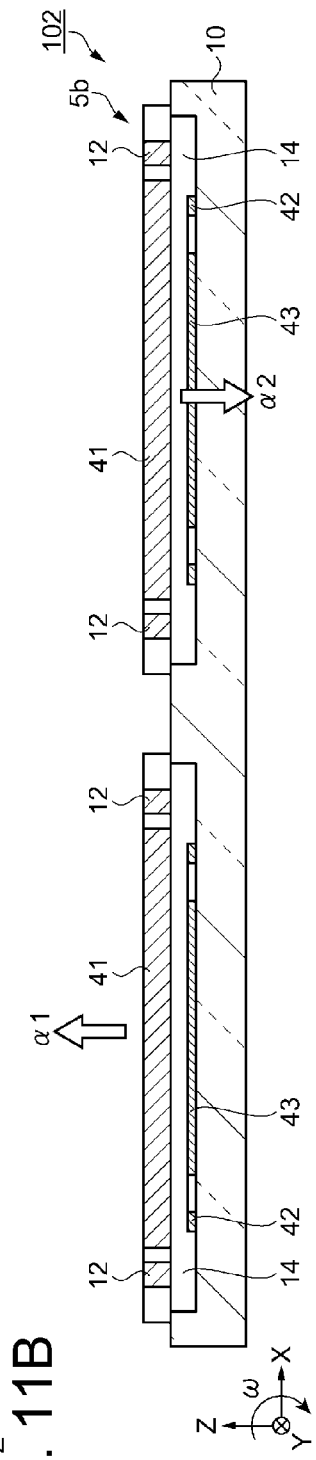
FIG. 11A
FIG. 11B

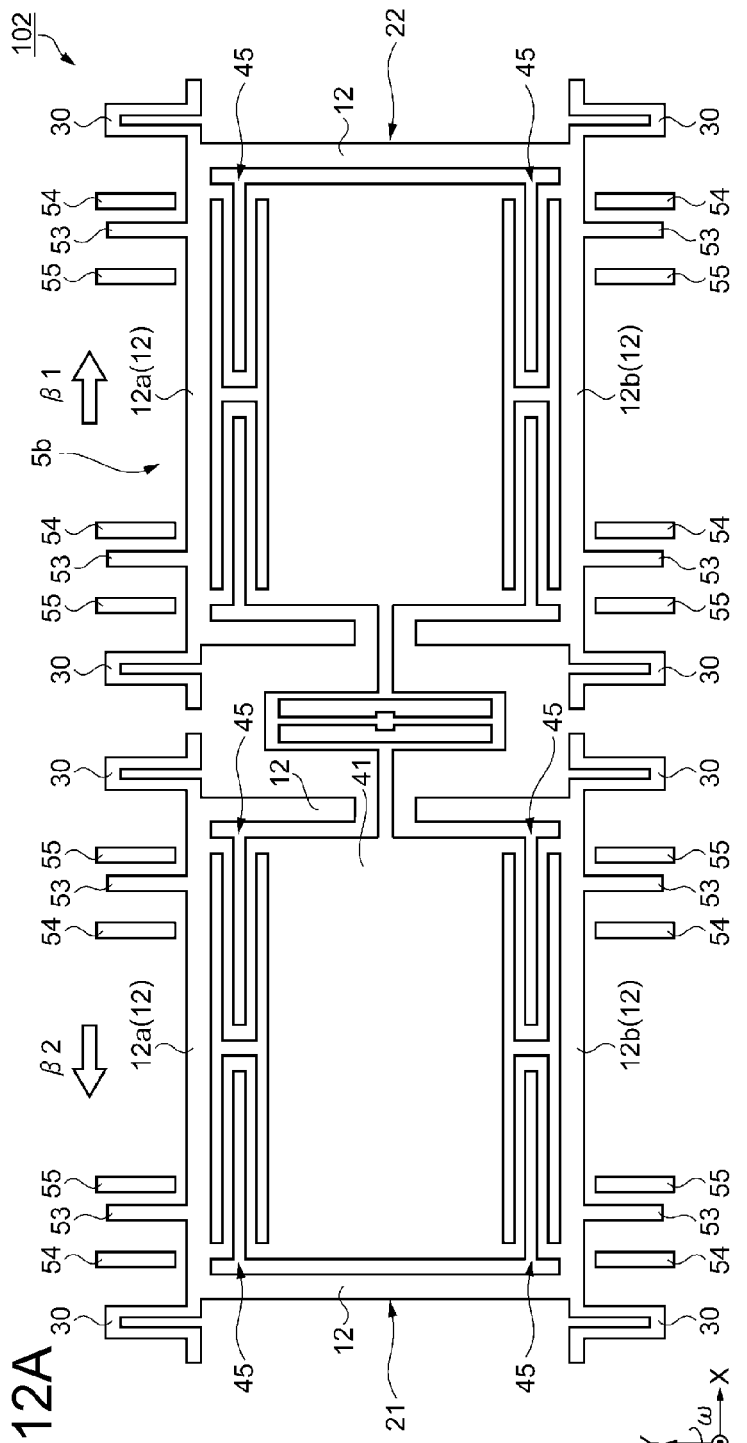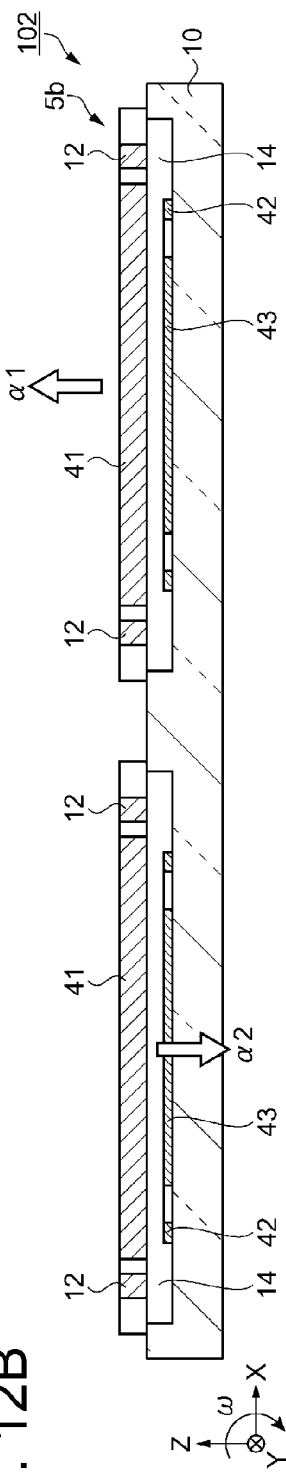

FUNCTIONAL ELEMENT, ELECTRONIC DEVICE, ELECTRONIC APPARATUS, AND MOVING OBJECT

CROSS-REFERENCE TO RELATED APPLICATIONS

This application claims priority to Japanese Patent Application No. 2014-013064 filed on Jan. 28, 2014. The entire disclosure of Japanese Patent Application No. 2014-013064 is hereby incorporated herein by reference.

BACKGROUND

1. Technical Field

The present invention relates to a functional element, an electronic device, an electronic apparatus, and a moving object each using the functional element.

2. Related Art

In recent years, a functional element using, for example, silicon MEMS (Micro Electro Mechanical Systems) technology has been developed as a vibratory device. Further, there has been disclosed a gyro sensor (a capacitive MEMS gyro sensor element) for detecting an angular velocity using a gyro element as an example of the functional element. As an example of such a gyro sensor, there are provided a vibration system structure disposed on an X-Y plane out of the three axes (X axis, Y axis, and Z axis) perpendicular to each other, a substrate for supporting the vibration system structure, a drive device for the vibration system structure, and a detection device for detecting the angular velocity around the Y axis as the gyro sensor disclosed in, for example, JP-A-2012-83112 (Document 1) (see, e.g., Document 1).

In the gyro sensor described in Document 1, there has been used a capacitive MEMS gyro sensor element (hereinafter referred to as a "gyro sensor element") which has a drive section including an extending section having a frame-like shape, and is provided with a driving spring section disposed outside the extending section, and a detection section and a detecting spring section for connecting the detection section to the extending section both disposed inside the extending section. In this gyro sensor element, the drive section vibrating in the X-axis direction vibrates in the Z-axis direction due to the angular velocity around the Y axis, and the angular velocity can be detected by the detection section detecting the variation in capacitance due to the vibration in the Z-axis direction.

However, in the gyro element described above, a machining error occurs in the dry etching process of the silicon structure constituting the gyro sensor, and thus, the cross-sectional shape, which should normally be a square or a rectangle, is formed to be a parallelogram. Since the cross-sectional shape of the silicon structure becomes a parallelogram as described above, a component (an oblique vibration) vibrating in directions perpendicular to an oblique side of the cross-section occurs in the driving vibration in the drive section vibrating in the X-axis direction. Since the oblique vibration in the drive section has the vibration component in the Z-axis direction, the oblique vibration propagates to the detection section due to a so-called vibration leakage phenomenon, which is a phenomenon that the driving vibration of the drive section propagates to the detection section, and thus, there is caused a so-called quadrature phenomenon that the detection section vibrates in the Z-axis direction as the vibration direction in which the angular velocity is detected. Due to this phenomenon, there are some cases in which the detection section detects the angular velocity despite no angular velocity occurs, or an error occurs in the angular velocity detected. In other words, there is a possibility of degrading the detection accuracy of the angular velocity.

SUMMARY

An advantage of some aspects of the invention is to solve at least a part of the problems described above, and the invention can be implemented as the following aspects or application examples.

Application Example 1

A functional element according to this application example includes a support body, a detection section connected to the support body, and adapted to detect a vibration in a direction along a first axis assuming that two axes perpendicular to each other are the first axis and a second axis, and an axis parallel to a normal line of a plane including the first axis and the second axis is a third axis, at least one drive coupling section having a first part, which is connected to the support body and extends along the first axis, and a second part, which is connected to the first part, shorter than a dimension of the first part along the first axis, and extends along the second axis, and a mass section connected to the drive coupling section, and connected to the support body via the drive coupling section, and the mass section performs a drive vibration in a direction along the third axis.

According to this application example, it results that the vibration component, which is generated by the vibration component of the first vibrating body vibrating in the direction along the third axis propagating to the drive coupling sections having a parallelogram cross-sectional shape, has the principal component in the direction along the third axis, and includes the vibration component in the direction along the second axis. As described above, in the functional element according to this configuration, since the detection vibration of the detection section is in the direction along the first axis, even if the vibration component (in the direction along the third axis and the direction along the second axis) of the first vibrating body vibrating in the direction along the third axis propagates to the detection section via the drive coupling section, there is no chance of causing the detection vibration of the detection section, and thus, no detection error is caused. In other words, the functional element improved in the detection accuracy can be realized.

Further, the drive coupling section includes the first part, which extends along the first axis, and the second part, which is connected to the first part, extends along the second axis so as to be shorter than a dimension of the first part along the first axis, and is therefore easy to deflect in the direction along the second axis, but difficult to deflect in the direction along the first axis in which the long sides are formed. Therefore, even if the cross-sectional shape becomes a parallelogram, it is difficult to generate the vibration component in the direction along the first axis, and it becomes possible to further reduce the detection error in the detection section.

Further, since the drive coupling section is provided with the first part as the long side and the second part as a short side, the spring constant of the drive coupling section can be decreased to a lower level, and it becomes possible to efficiently perform the drive vibration of the mass section. In other words, it becomes possible to make the drive vibration easy to occur.

It should be noted that in the descriptions related to the invention, in the case of using the term. "above" in such a phrase as "a specific object (hereinafter referred to as "B") is formed "above" another specific object (hereinafter referred to as "A")," the term "above" is used intending to include both of the case of forming B directly on A and the case of forming B indirectly on A via another object.

Further, in the descriptions related to the invention, the term "planar view" is used as a term which means "a planar view viewed from a normal direction of a base surface of the base body on which the vibrating body is disposed."

Application Example 2

In the functional element according to the application example described above, it is preferable that the functional element further includes a base body, and the detection section includes a detecting movable electrode extending from the support body in the direction along the second axis, and a detecting stationary electrode, which is opposed to the detecting movable electrode, extends in the direction along the second axis, and is supported by the base body.

According to this application example, the detection section includes the detecting movable electrode extending from the support body in the direction along the second axis and the detecting stationary electrode supported by the substrate in the direction along the second axis, and can therefore efficiently detect the vibration (displacement) of the first vibrating body in the direction along the first axis, and it becomes possible to improve the detection accuracy.

Application Example 3

In the functional element according to the application example described above, it is preferable that the two drive coupling sections are disposed side by side in the direction along the first axis.

According to this application example, since the mass section (the first vibrating body) is connected to the support body with the two drive coupling sections arranged side by side along the first axis, the support posture of the mass section is stabilized, and thus, the drive vibration can be stabilized. Thus, it is possible to stably start up the vibration in the direction along the first axis in the case in which the angular velocity is applied, and it becomes possible to improve the detection accuracy.

Application Example 4

In the functional element according to the application example described above, it is preferable that the drive coupling section includes a first drive coupling section and a second drive coupling section, the first drive coupling section is connected to one side of the mass section, and the second drive coupling section is connected to the other side of the mass section on an opposite side to the one side.

According to this application example, since the mass section is connected to the support body on both sides across the mass section (the first vibrating body) from each other, it becomes possible to further stabilize the support posture of the mass section. Thus, it is possible to further stabilize the drive vibration, and to stably start up the vibration in the direction along the first axis in the case in which the angular velocity is applied, and it becomes possible to improve the detection accuracy.

Application Example 5

In the functional element according to the application example described above, it is preferable that the drive coupling section is configured to fulfill a relationship of (a spring constant in the direction along the third axis)<(a spring constant in the direction along the first axis).

According to this application example, by setting the deflection in the direction along the first axis of the drive coupling section to be smaller than the deflection in the direction along the third direction, the abnormal vibration in the direction along the first axis propagating to the detection section is reduced and the detection accuracy in the direction along the first axis is improved. Therefore, it becomes possible to improve the detection accuracy of the angular velocity.

Application Example 6

In the functional element according to the application example described above, it is preferable that the drive coupling section is configured to fulfill a relationship of (a spring constant in the direction along the second axis)<(a spring constant in the direction along the first axis).

According to this application example, by setting the deflection in the direction along the first axis of the drive coupling section to be smaller than the deflection in the direction along the second direction, the abnormal vibration in the direction along the first axis propagating to the detection section is reduced and the detection accuracy in the direction along the first axis is improved. Therefore, it becomes possible to improve the detection accuracy of the angular velocity.

Application Example 7

In the functional element according to the application example described above, it is preferable that the functional element further includes a drive electrode adapted to make the mass section perform the drive vibration, and a drive monitor electrode adapted to monitor the vibration of the mass section, and the drive electrode and the drive monitor electrode are each at least partially opposed to the mass section, and are supported by the base body.

According to this application example, the base body opposed to the mass section is provided with the drive electrode and the drive monitor electrode, and it is possible to monitor the vibration state of the mass section, which is vibrated by the drive electrode, using the variation in capacitance between the drive electrode and the drive monitor electrode, and then control the drive vibration of the mass section based on the result. Thus, the more stable drive vibration can be obtained.

Application Example 8

In the functional element according to the application example described above, it is preferable that the functional element further includes a second vibrating body arranged side by side with the first vibrating body in the direction along the first axis, and a vibrating body coupling section disposed between the first vibrating body and the second vibrating body to connect the first vibrating body and the second vibrating body to each other, and the first vibrating body and the second vibrating body are connected to the support body via the respective drive coupling sections.

According to this application example, the two vibrating bodies, namely the first vibrating body and the second vibrating body, are arranged side by side via the vibrating body coupling section. By making the respective vibrating bodies arranged in such a manner as described above perform the drive vibrations in the respective directions opposite to each other along the third axis, it becomes possible to cancel out the accelerations linearly applied thereto, and it becomes possible to more accurately detect the angular velocity in the rotational direction (the angular velocity around the second axis).

Application Example 9

In the functional element according to the application example described above, it is preferable that the second vibrating body includes a drive electrode adapted to make the mass section perform the drive vibration, and a drive monitor electrode adapted to monitor the vibration of the mass section, and the drive electrode and the drive monitor electrode are each at least partially opposed to the mass section, and are supported by the base body.

According to this application example, it is possible to cancel out the accelerations linearly applied thereto, and it is possible to monitor the vibration state of the mass section using the variation in capacitance of the drive monitor electrode, and to control the drive vibration of the mass section based on the result. Thus, it is possible to obtain a more stable drive vibration, and to more stably detect the angular velocity.

Application Example 10

In the functional element according to the application example described above, it is preferable that the functional element further includes a detection coupling section, which extends from the support body, and can be expanded and contracted in the direction along the first axis, and a spring constant in the direction along the third axis of the detection coupling section is higher than a spring constant in the direction along the third axis of the drive coupling section.

According to this application example, since the spring constant in the direction along the third axis of the detection coupling section is higher than the spring constant in the direction along the third axis of the drive coupling section, it becomes possible to suppress the vibration of the support section in the direction along the third axis.

Application Example 11

An electronic device according to this application example includes the functional element according to any one of the application examples described above, and a package housing the functional element.

According to this application example, since the functional element improved in the detection accuracy is housed in the package, it is possible to prevent the functional element from deteriorating, and it is possible to provide an electronic device capable of keeping the high detection accuracy.

Application Example 12

An electronic apparatus according to this application example includes the functional element according to any one of the application examples described above.

According to this application example, due to the accurate detection performed by using the functional element improved in detection accuracy, the electronic apparatus with more stable characteristics can be provided.

Application Example 13

A moving object according to this application example includes the functional element according to any one of the application examples described above.

According to this application example, due to the accurate detection performed by using the functional element improved in detection accuracy, the moving object with more stable characteristics can be provided.

BRIEF DESCRIPTION OF THE DRAWINGS

The invention will be described with reference to the accompanying drawings, wherein like numbers reference like elements.

FIGS. 9A and 9B are diagrams for explaining an operation of the gyro sensor according to the second embodiment.

FIGS. 10A and 10B are diagrams for explaining an operation of the gyro sensor according to the second embodiment.

FIGS. 11A and 11B are diagrams for explaining an operation of the gyro sensor according to the second embodiment.

FIGS. 12A and 12B are diagrams for explaining an operation of the gyro sensor according to the second embodiment.

DESCRIPTION OF EXEMPLARY EMBODIMENTS

Hereinafter, some preferred embodiments of the invention will be explained in detail with reference to the accompanying drawings. It should be noted that the embodiments described below do not unreasonably limit the contents of the invention as set forth in the appended claims. Further, all of the constituents explained hereinafter are not necessarily essential elements of the invention.

1. Gyro Sensor 1-1. Configuration of Gyro Sensor According to First Embodiment

Figure 1:
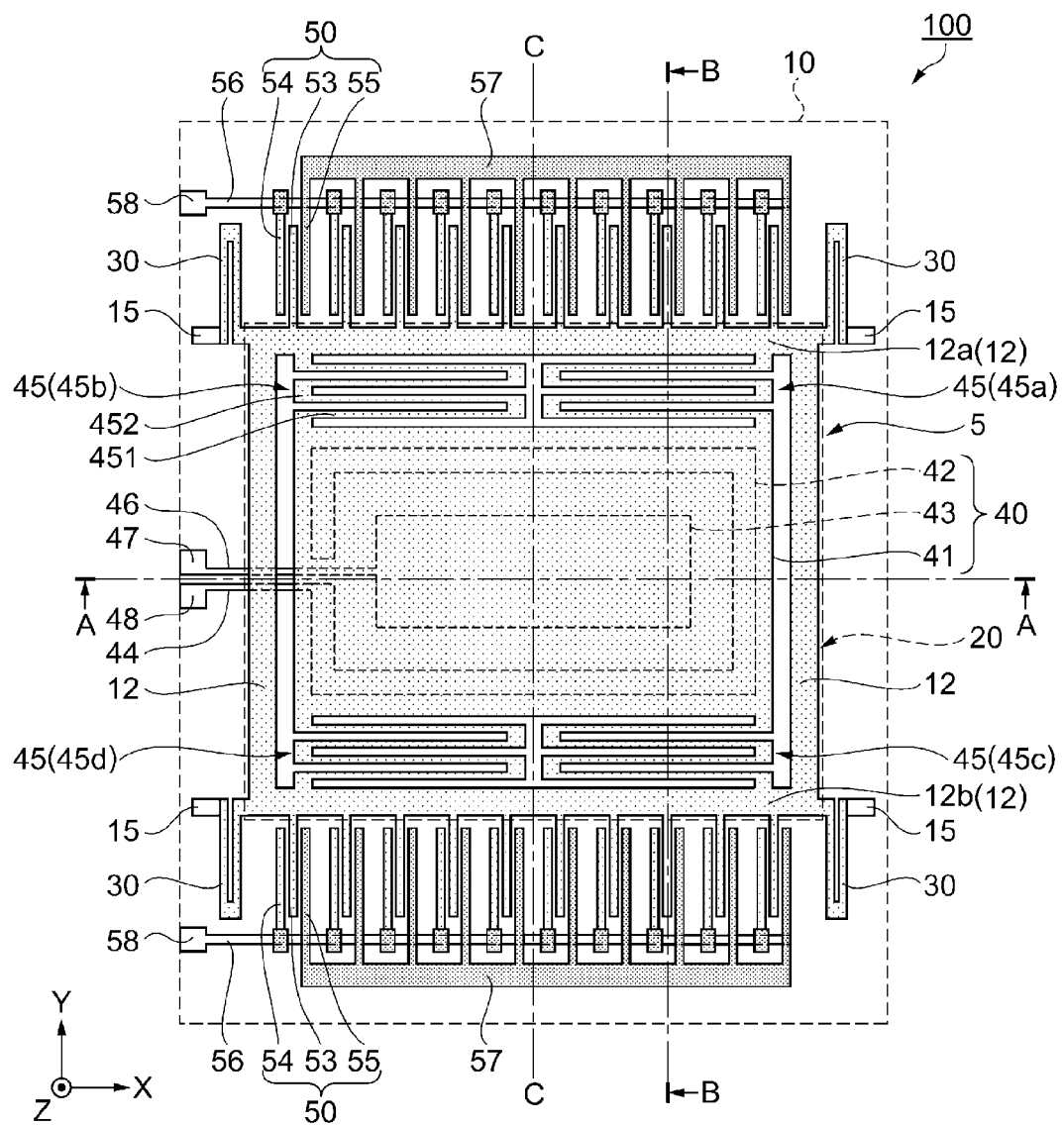
FIG. 1 is a plan view schematically showing a gyro sensor according to a first embodiment of the invention.
Figure 2:
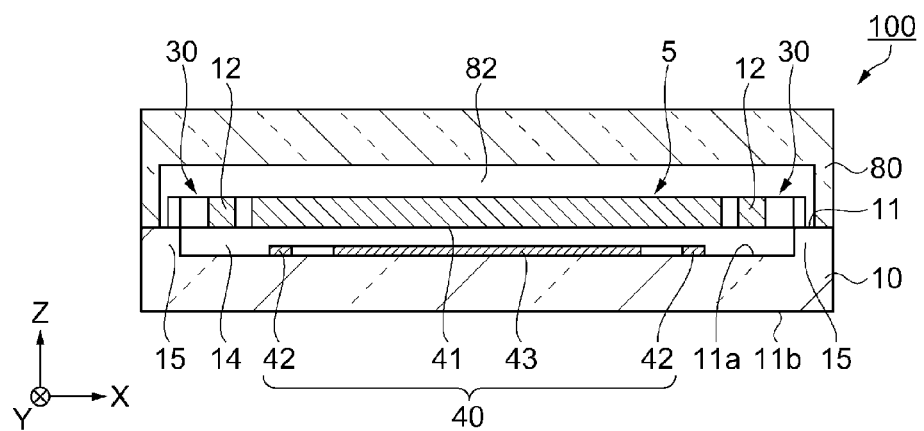
FIG. 2 is a cross-sectional view schematically showing the gyro sensor according to the first embodiment.
Figure 3:
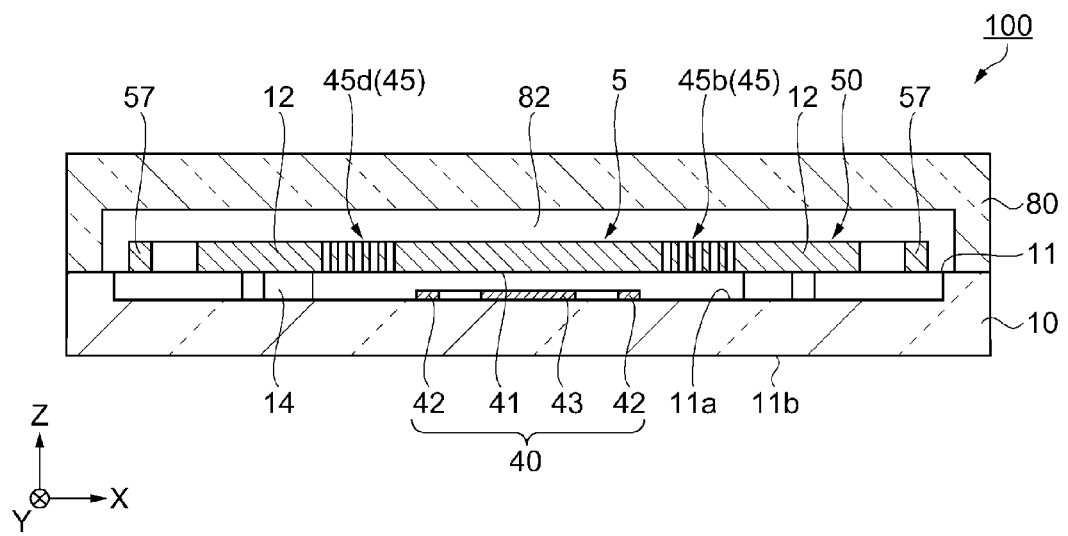
FIG. 3 is a cross-sectional view schematically showing the gyro sensor according to the first embodiment.

Firstly, a gyro sensor according to a first embodiment of the invention as an electronic device using a gyro element as a functional element will be explained with reference to the accompanying drawings. FIG. 1 is a plan view schematically showing the gyro sensor 100 according to the first embodiment. FIG. 2 is a cross-sectional view along the A-A line shown in FIG. 1 and schematically showing the gyro sensor 100 according to the first embodiment. FIG. 3 is a cross-sectional view along the B-B line shown in FIG. 1 and schematically showing the gyro sensor 100 according to the first embodiment. It should be noted that in FIGS. 1 through 3, an X axis (a first axis), a Y axis (a second axis), and a Z axis (a third axis) are shown as three axes perpendicular to each other.

As shown in FIGS. 1 through 3, the gyro sensor 100 includes a base body 10 and a gyro element 5 as the functional element. The gyro element 5 as the functional element includes a vibrating body 20 as a first vibrating body, detection coupling sections 30, and detection sections 50. The gyro element 5 is housed in a cavity 82 surrounded by the base body 10 and a lid body 80. The gyro element 5 is disposed above the base body 10 via a gap (a recessed section 14). The gyro element 5 is supported by fixation sections 15 provided to a first surface 11 of the base body 10 (on the base body 10) via the detection coupling sections 30. In the gyro sensor 100, the detection sections 50 constituting the gyro element 5 each correspond to a gyro sensor element (a capacitive MEMS gyro sensor element) for detecting the angular velocity around the Y axis. It should be noted that in FIG. 1, the graphical description is presented seeing through the base body 10 and the lid body 80 for the sake of convenience. Further, a view from the normal direction of the first surface 11 (see FIG. 2) as a base surface of the base body 10 on which the vibrating body 20 is disposed, namely viewing the vibrating body 20 supported by the base body 10 from above, is hereinafter referred to as a "planar view."

The material of the base body 10 is, for example, glass or silicon. As shown in FIG. 2, the base body 10 has the first surface 11, and a second surface 11b on the opposite side to the first surface 11. The first surface 11 is provided with the recessed section 14. Above the recessed section 14, there are disposed the vibrating body 20 (a mass section 41, drive coupling sections 45, and a support body 12), the detection coupling sections 30, and the detection sections 50 via a gap. Due to the recessed section 14, the vibrating body 20, the detection coupling sections 30, and the detection sections 50 can move in a desired direction without being hindered by the base body 10. The planar shape (the shape viewed from the Z-axis direction) of the recessed section 14 is not particularly limited, but is a rectangular shape in the example shown in FIG. 1. The recessed section 14 is formed using, for example, a photolithography process and an etching process.

As shown in FIG. 2, the base body 10 has the fixation sections 15 arbitrarily provided to the first surface 11 in accordance with the configuration of the vibrating body 20. The fixation sections 15 are each a part, to which one end of the detection coupling section 30 for supporting the vibrating body 20 is fixed (bonded), and which supports the vibrating body 20 via the detection coupling section 30. As shown in FIGS. 1 and 2, the fixation sections 15 can also be disposed across the vibrating body 20 from each other in the X-axis direction. Further, as shown in FIG. 1, the fixation sections 15 can also be disposed across the vibrating body 20 from each other in the Y-axis direction. In other words, the fixation sections 15 can also be disposed at two places, or at four places.

The method of fixing (bonding) the first surface 11 (the base body 10) of the fixation sections 15 to the detection coupling sections 30, first detecting stationary electrodes 54, second detecting stationary electrodes 55, and so on described later is not particularly limited, but in the case in which the material of the base body 10 is glass, and the material of the vibrating body 20 and so on is silicon, anodic bonding can be applied.

The vibrating body 20 as the first vibrating body is supported by the first surface 11 of the base body 10 (above the base body 10) via the detection coupling sections 30. As shown in FIG. 1, the vibrating body 20 has the mass section 41 (a drive section 40), the drive coupling sections 45, and the support body 12 (first support section 12a, second support section 12b). The material of the vibrating body 20 is, for example, silicon provided with electrical conductivity by doping impurities such as phosphorus or boron. The vibrating body 20 is formed by, for example, processing a silicon substrate (not shown) using a photolithography process and an etching process.

The vibrating body 20 is supported by the fixation sections 15 via the detection coupling sections 30, and is disposed so as to be separated from the base body 10. More specifically, the vibrating body 20 is disposed above the base body 10 via the gap (the recessed section 14). The vibrating body 20 has, for example, the support body 12 having a frame-like shape (a square shape). As shown in FIG. 1, the vibrating body 20 can also have a shape symmetric about the A-A line (a straight line along the X axis) or the C-C line (a straight line along the Y axis).

The detection coupling sections 30 are each configured so that the vibrating body 20 can be displaced in the X-axis direction. More specifically, the detection coupling sections 30 each have a shape extending in the X-axis direction from the fixation section 15 to the vibrating body 20 while reciprocating in the Y-axis direction. One end of each of the detection coupling sections 30 is bonded (fixed) to the fixation section 15 (the first surface 11 of the base body 10). Further, the other end of each of the detection coupling sections 30 is connected to the vibrating body 20. In the example shown in the drawings, there are disposed four detection coupling sections 30 across the vibrating body 20 from each other in the X-axis direction.

Further, the spring constant in the Z-axis direction of the detection coupling sections 30 is set to be higher than the spring constant in the Z-axis direction of the drive coupling sections 45. By setting the spring constant in the Z-axis direction of the detection coupling sections 30 to be higher than the spring constant in the Z-axis direction of the drive coupling sections 45 as described above, it becomes possible to inhibit the support body 12 (the first support section 12a, the second support section 12b) from vibrating in the Z-axis direction.

The material of the detection coupling sections 30 is, for example, silicon provided with electrical conductivity by doping impurities such as phosphorus or boron. The detection coupling sections 30 are formed by, for example, processing a silicon substrate (not shown) integrally with the vibrating body 20 using a photolithography process and an etching process.

The drive section 40 is disposed on the inner side of the support body 12 having a frame-like shape in the planar view. The drive section 40 has a mechanism capable of exciting the vibration of the mass section 41 of the vibrating body 20. The drive section 40 is provided with the mass section 41 connected to the support body 12 via the drive coupling sections 45, a drive electrode 42 disposed on the base body 10 at a position opposed to the mass section 41 so as to have a frame-like shape, and a drive monitor electrode 43 disposed on the base body 10 on the inner side of the drive electrode 42 having the frame-like shape so as to be opposed to the mass section 41.

The drive coupling sections 45 are each provided with long sides 451 as a first part each disposed along the X axis so as to have a thin-width shape. Further, the drive coupling sections 45 can also be provided with the long sides 451 extending along the X axis, and bent sections (short sides 452 as a second part) where the long sides 451 are folded so as to extend along the X axis in parallel to each other. It should be noted that the number of the bent sections is not particularly limited. Since such long sides 451 are provided, the drive coupling sections 45 are easy to deflect in the Y-axis direction as the thin-width direction, and difficult to deflect in the X-axis direction as the long-side direction. Therefore, the vibration component in the X-axis direction is difficult to occur in the drive coupling sections 45, and it is possible to prevent the vibration component in the X-axis direction out of the vibration of the drive section 40 from propagating through the support body 12 (the first support section 12*a*, the second support section 12*b*) and then propagating to the detection sections 50. Thus, it becomes possible to decrease the detection error in the detection sections 50 due to the vibration leakage phenomenon from the drive section 40.

Further, the drive coupling sections 45 can be configured so as to fulfill the relationship of (the spring constant in the Z-axis direction)<(the spring constant in the X-axis direction) and (the spring constant in the Y-axis direction)<(the spring constant in the X-axis direction). By adopting such a configuration of the spring constants of the drive coupling sections 45 as described above, it becomes possible to set the deflection in the X-axis direction of the drive coupling sections 45 to be smaller than those in other directions (the Z-axis direction, the Y-axis direction) to thereby decrease an abnormal vibration such as the vibration leakage in the X-axis direction propagating to the detection sections 50 to improve the detection accuracy in the X-axis direction in which the angular velocity is detected to thereby improve the detection accuracy of the angular velocity.

Figure 4:
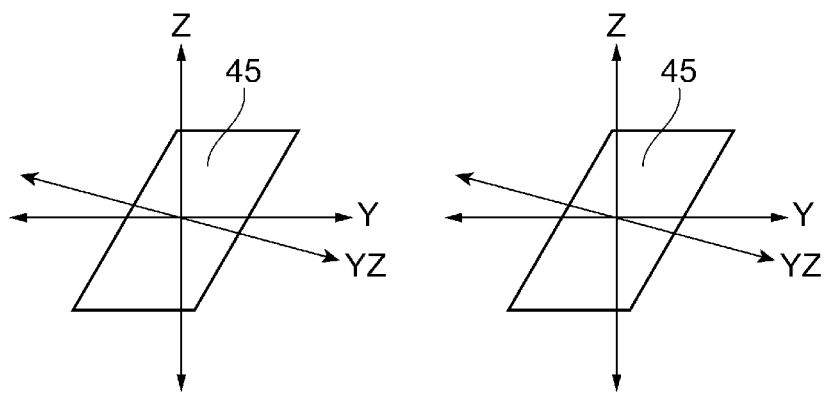
FIG. 4 is a cross-sectional view schematically showing a vibration direction of a vibrating body coupling section of the embodiment.

Further, even in the case in which the structure is provided with a parallelogram shape due to the etching process for forming the gyro element 5 including the vibrating body 20 and so on as shown in FIG. 4, since the long sides extending along the X axis are provided as described above, it results that the deflection direction of the drive coupling sections 45 includes a component in the X-axis direction and a component in the Y-axis direction. Therefore, since the vibration component in the X-axis direction, in which the detection sections 50 described later detect the angular velocity, does not occur, it becomes possible to improve the detection accuracy of the angular velocity. It should be noted that FIG. 4 is a cross-sectional view obtained by cutting the drive coupling section 45 at the position of and from the direction of the B-B line shown in FIG. 1.

It is possible to dispose two drive coupling sections (a first drive coupling section 45*a* and a second drive coupling section 45*b*) side by side across the vibrating body 20 from each other in the X-axis direction. Since the mass section 41 is connected to the support body 12 (the first support section 12*a*) with the two drive coupling sections 45 (the first drive coupling section 45*a* and the second drive coupling section 45*b*) along the X-axis direction, the support posture in the X-axis direction of the mass section 41 can be stabilized.

Further, the drive coupling sections 45 can also be arranged across the mass section 41 from each other in the Y-axis direction. Specifically, the first drive coupling section 45*a* and the second drive coupling section 45*b* are connected to one side of the mass section 41, and a third drive coupling section 45*c* and a fourth drive coupling section 45*d* are connected to the other side of the mass section 41 on the opposite side to the one side. As described above, the mass section 41 is connected to the first support section 12*a* (the support body 12) via the first drive coupling section 45*a* and the second drive coupling section 45*b* on the one side, and is connected to the second support section 12*b* (the support body 12) via the third drive coupling section 45*c* and the fourth drive coupling section 45*d* on the other side. Since the mass section 41 is connected to the support body 12 in such a manner as described above, it becomes possible to further stabilize the support posture of the mass section 41 in a plane direction including the X-axis direction and the Y-axis direction. Thus, the drive vibration of the mass section 41 can further be stabilized.

The mass section 41 has a function of a movable electrode, and is electrically connected to the power supply not shown. When a voltage is applied to the mass section 41 and the drive electrode 42 described later, it is possible to generate an electrostatic force between the mass section 41 and the drive electrode 42. Due to the electrostatic force, it is possible to make the mass section 41 vibrate along the Z axis using the drive coupling sections 45 as supporting points.

The material of the mass section 41 is, for example, silicon provided with electrical conductivity by doping impurities such as phosphorus or boron. The mass section 41 is formed by, for example, processing a silicon substrate (not shown) integrally with the vibrating body 20 using a photolithography process and an etching process.

The drive electrode 42 is an electrode for driving the mass section 41, and is disposed so as to at least partially be opposed to the mass section 41, and is bonded to the bottom surface 11*a* of the recessed section 14 provided to the base body 10. The drive electrode 42 of the present embodiment is disposed so as to have a roughly rectangular frame-like shape along the outer edge portion of the mass section 41. The drive electrode 42 is electrically connected to a connection terminal 48 disposed on the outer side of the support body 12 in the planar view via a connection wiring line 44, and is further electrically connected to a power supply not shown.

The drive monitor electrode 43 is an electrode for monitoring the vibration state of the mass section 41 to control the vibration. The drive monitor electrode 43 is disposed so as to at least partially be opposed to the mass section 41, and is bonded to the bottom surface 11*a* of the recessed section 14 provided to the base body 10. The drive monitor electrode 43 of the present embodiment is disposed so as to have a roughly rectangular shape opposed to a central portion of the mass section 41. The drive monitor electrode 43 is electrically connected to a connection terminal 47 disposed on the outer side of the support body 12 in the planar view via a connection wiring line 46. The drive monitor electrode 43 detects and monitors a variation in capacitance with the mass section 41, and can control the drive vibration of the mass section 41 based on the result. Thus, the more stable drive vibration of the mass section 41 can be obtained.

The drive electrode 42 and the drive monitor electrode 43 are formed by depositing a transparent electrode material such as ITO (indium tin oxide) or ZnO (zinc oxide) using a sputtering process, and then pattering the result using a photolithography process, an etching process, and so on. It should be noted that as the material of the drive electrode 42 and a drive monitor electrode 43, there can also be used metal materials such as gold (Au), gold alloy, platinum (Pt), aluminum (Al), aluminum alloy, silver (Ag), silver alloy, chromium (Cr), chromium alloy, copper (Cu), molybdenum (Mo), niobium (Nb), tungsten (W), iron (Fe), titanium (Ti), cobalt (Co), zinc (Zn), or zirconium (Zr) besides the transparent electrode material. Further, in the case in which the base body 10 is made of a semiconductor material such as silicon, it is preferable to provide an insulating layer disposed between the base body 10 and the drive electrode 42 or the drive monitor electrode 43. As the material of the insulating layer, there can be used, for example, SiO2 (silicon oxide), AlN (aluminum nitride), and SiN (silicon nitride).

The detection sections 50 are respectively disposed on the outer side of the first support section 12a and the second support section 12b of the support body 12 of the vibrating body 20. In other words, the detection sections 50 are disposed on the opposite side of the first support section 12a and the second support section 12b, respectively, to the side on which the vibrating body 20 is disposed. The detection sections 50 each have detecting movable electrodes 53 as movable electrodes, first detecting stationary electrodes 54 and second detecting stationary electrodes 55 as detecting stationary electrodes.

The detecting movable electrodes 53 extend from each of the first support section 12a and the second support section 12b toward the outer side along the Y-axis direction so as to forma thin-width shape (a rectangular rod shape). The number of the detecting movable electrodes 53 is two or more, and the detecting movable electrodes 53 are arranged side by side with gaps in the X-axis direction. It should be noted that the number of the detecting movable electrodes 53 is not particularly limited.

The first detecting stationary electrode 54 and the second detecting stationary electrode 55 as the detecting stationary electrodes are disposed on both sides in the X-axis direction of the detecting movable electrode 53 intervening therebetween so as to extend in the Y-axis direction while being opposed to the detecting movable electrode 53. The first detecting stationary electrodes 54 and the second detecting stationary electrodes 55 are bonded (fixed) to the first surface 11 of the base body 10. In the example shown in the drawings, the plurality of first detecting stationary electrodes 54 and the plurality of second detecting stationary electrodes 55 are disposed so as to correspond respectively to the detecting movable electrodes 53, and are disposed so as to be opposed to each other via the respective detecting movable electrodes 53. In other words, the first detecting stationary electrodes 54 and the second detecting stationary electrodes 55 are disposed so as not to overlap the detecting movable electrodes 53 in the planar view. Further, the first detecting stationary electrodes 54 are electrically connected to a connection terminal 58 via a wiring section 56. Further, the second detecting stationary electrodes 55 are connected to a detection connecting section 57, and are electrically connected to an external terminal not shown.

As described above, since the detection sections 50 each have the detecting movable electrodes 53 disposed so as to extend from the support body 12 along the Y-axis direction, and the first detecting stationary electrodes 54 and the second detecting stationary electrodes 55 supported by a substrate along the Y-axis direction, the detection sections 50 can efficiently detect the vibration (displacement) of the vibrating body 20 in the X-axis direction generated when the angular velocity acts thereon, and it becomes possible to improve the detection accuracy of the angular velocity.

In the case in which a Coriolis force corresponding to the angular velocity is exerted on the mass section 41, the detection sections 50 can detect the vibration in the X-axis direction generated in the mass section 41 using the capacitance variation to calculate the Coriolis force corresponding to the angular velocity. Specifically, when the Coriolis force is exerted on the mass section 41 in the X-axis direction, the support body 12 (the first support section 12a and the second support section 12b) and the detecting movable electrodes 53 disposed so as to extend from the support body 12 also vibrate in the X-axis direction accordingly via the drive coupling sections 45. Thus, it is possible to detect the capacitance variation generated between the detecting movable electrodes 53, and the first detecting stationary electrodes 54 and the second detecting stationary electrodes 55 to calculate the capacitance variation as the angular velocity.

The material of the detection sections 50 is, for example, silicon provided with electrical conductivity by doping impurities such as phosphorus or boron. The detection sections 50 are formed by, for example, processing a silicon substrate (not shown) integrally with, or separately from the vibrating body 20 using a photolithography process and an etching process.

The lid body 80 is disposed on the base body 10. The base body 10 and the lid body 80 can constitute a package as shown in FIGS. 2 and 3. The base body 10 and the lid body 80 can form the cavity 82, and it is possible to house the gyro element 5 including the vibrating body 20 and so on in the cavity 82. The cavity 82 can be sealed in, for example, an inert gas (e.g., a nitrogen gas) atmosphere, or a vacuum atmosphere.

The material of the lid body 80 is, for example, silicon or glass. The method of bonding the lid body 80 and the base body 10 to each other is not particularly limited, but in the case in which, for example, the material of the base body 10 is glass, and the material of the lid body 80 is silicon, the base body 10 and the lid body 80 can anodically be bonded to each other. Further, the bonding portion between the base body 10 and the lid body 80 can be filled with an adhesive material or the like.

1-2. Operation of Gyro Sensor According to First Embodiment

Figure 5A:
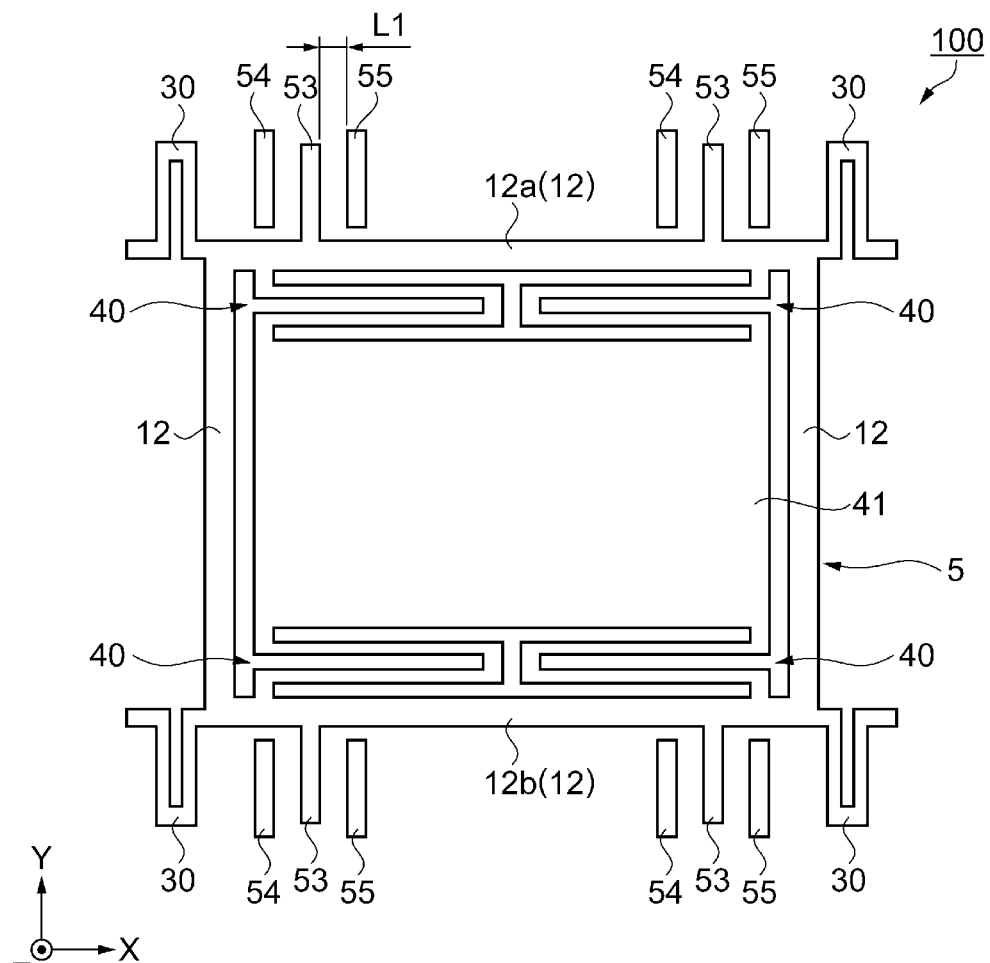
FIGS. 5A and 5B are diagrams for explaining an operation of the gyro sensor according to the first embodiment.
Figure 5B:
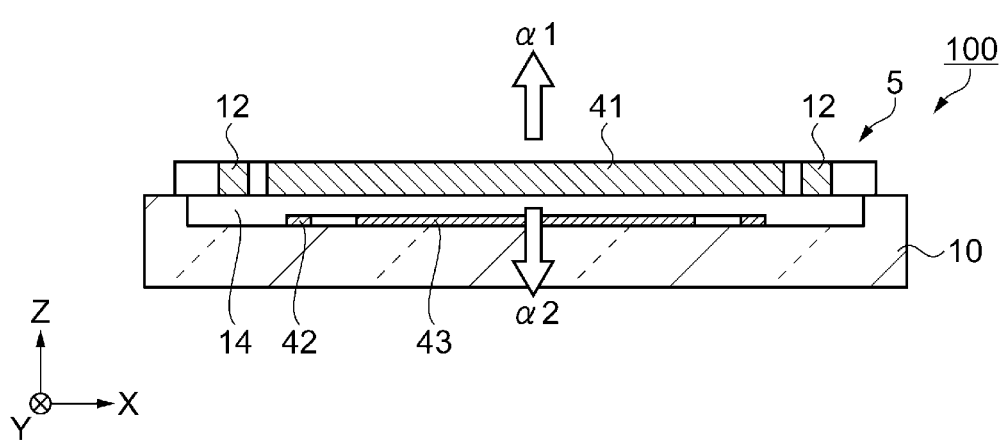
Figure 6A:
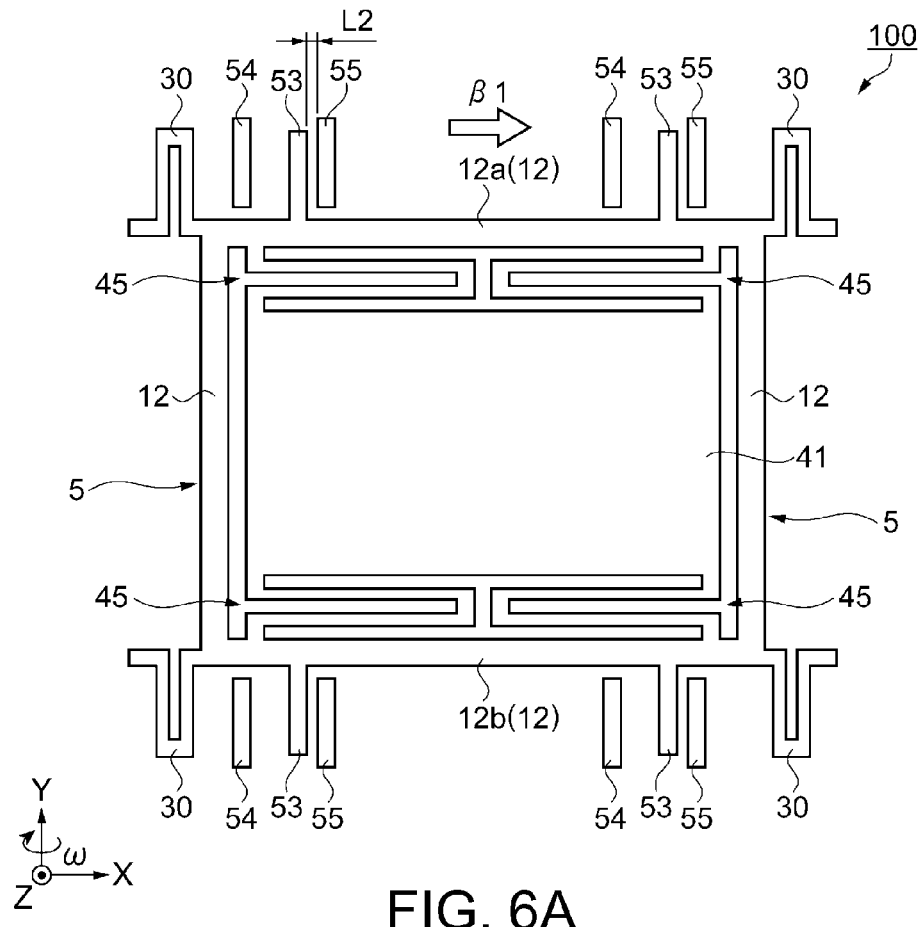
FIGS. 6A and 6B are diagrams for explaining an operation of the gyro sensor according to the first embodiment.
Figure 6B:
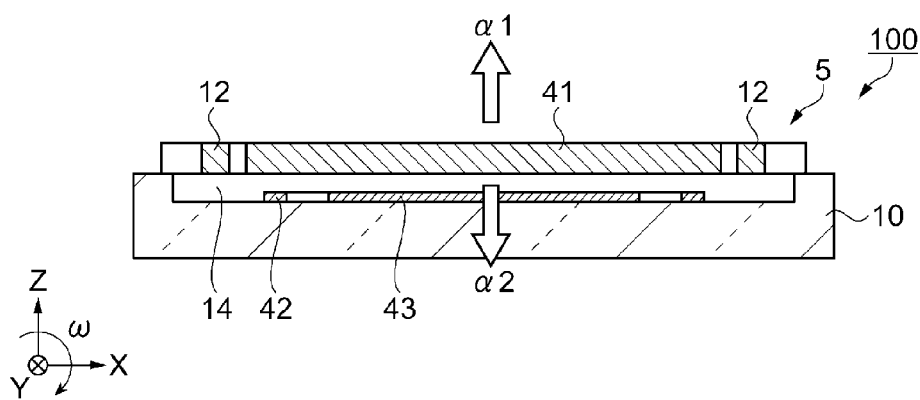

Then, an operation of the gyro sensor 100 will be explained with reference to the drawings. FIGS. 5A, 5B, 6A, and 6B are diagrams for schematically explaining the operation of the gyro sensor 100, wherein FIGS. 5A and 6A are plan views showing a general configuration, and FIGS. 5B and 6B are front cross-sectional view showing the general configuration. It should be noted that in FIGS. 5A, 5B, 6A, and 6B, the X axis, the Y axis, and the Z axis are shown as the three axes perpendicular to each other. Further, in FIGS. 5A, 5B, 6A, and 6B, each of the constituents of the gyro sensor 100 is shown in a simplified manner for the sake of convenience.

As described above, in the vibration mode of the gyro sensor 100, due to the electrostatic force generated between the mass section 41 constituting the vibrating body 20 as a first vibrating body and the drive electrode 42, the mass section 41 can reciprocate along the Z axis. More specifically, an alternating voltage is applied between the mass section 41 provided to the vibrating body 20 and the drive electrode 42. Thus, it is possible to make the mass section 41 vibrate along the Z axis at a predetermined frequency.

In the example shown in FIGS. 5A and 5B, the mass section 41 is displaced alternately in an α1 direction (+Z-axis direction) and an α2 direction (−Z-axis direction) at a predetermined frequency. On this occasion, the drive coupling sections 45 connecting the mass section 41 to the support body 12 (the first support section 12a, the second support section 12b) is displaced along the Z axis using the support body 12 (the first support section 12a, the second support section 12b) as supporting points due to the vibration of the mass section 41.

As shown in FIGS. 6A and 6B, if the angular velocity ω around the Y axis is applied to the gyro sensor 100 in the state in which the mass section 41 is vibrating along the Z axis, the Coriolis force acts on the mass section 41, and the support body 12 (the first support section 12a, the second support section 12b) and the detecting movable electrodes 53 disposed so as to extend from the support body 12 are also displaced in the X-axis direction accordingly via the drive coupling sections 45. In the example shown in FIGS. 6A and 6B, the detecting movable electrodes 53 are displaced in a β1 direction.

Since the detecting movable electrodes 53 are displaced along the X axis, the distance L between the detecting movable electrodes 53 and the first detecting stationary electrodes 54 or the second detecting stationary electrodes 55 varies. In other words, the distance L1 in FIG. 5A changes to the distance L2 in FIG. 6A. Therefore, the capacitance between the detecting movable electrodes 53, and the first detecting stationary electrodes 54 and the second detecting stationary electrodes 55 varies. In the gyro sensor 100, by applying a voltage to the detecting movable electrodes 53, and the first detecting stationary electrodes 54 and the second detecting stationary electrodes 55, it is possible to detect the variation in the capacitance between the detecting movable electrodes 53, and the first detecting stationary electrodes 54 and the second detecting stationary electrodes 55 to obtain the angular velocity ω around the Y axis.

According to the gyro sensor 100 related to the first embodiment, there are included the vibrating body 20 (the mass section 41) vibrating in the Z-axis direction and the detection sections 50 for detecting the displacement in the X-axis direction caused by the angular velocity ω around the Y axis. It results that the vibration component, which is generated by the vibration component of the vibrating body 20 (the mass section 41) vibrating in the Z-axis direction propagating to the drive coupling sections 45 having a parallelogram cross-sectional shape, has the principal component in the Z-axis direction, and includes the vibration component in the Y-axis direction. According to the gyro element 5 constituting the gyro sensor 100, since the displacement direction detected by the detection sections 50 is the X-axis direction, even if the vibration component (in the Z-axis direction and the Y-axis direction) of the vibrating body 20 vibrating in the Z-axis direction propagates to the detection sections 50 via the drive coupling sections 45, there is no chance of causing the displacement (the detection vibration) of the detection sections 50, and thus, no detection error is caused. In other words, the gyro element 5 improved in the detection accuracy can be realized.

Further, the drive coupling sections 45 in the gyro element 5 each have the long sides disposed along the X-axis direction, and are therefore easy to deflect in the Y-axis direction the width in which is narrow, but difficult to deflect in the X-axis direction in which the long sides extend. Therefore, even if the cross-sectional shape is changed to a parallelogram, the vibration component in the X-axis direction is difficult to occur. In other words, it is possible to prevent the vibration component in the X-axis direction out of the vibration of the drive section 40 from propagating through the support body 12 (the first support section 12a, the second support section 12b) and then propagating to the detection sections 50. Thus, it becomes possible to decrease the detection error in the detection sections 50 due to the vibration leakage phenomenon from the drive section 40.

1-3. Configuration of Gyro Sensor According to Second Embodiment

Figure 7:
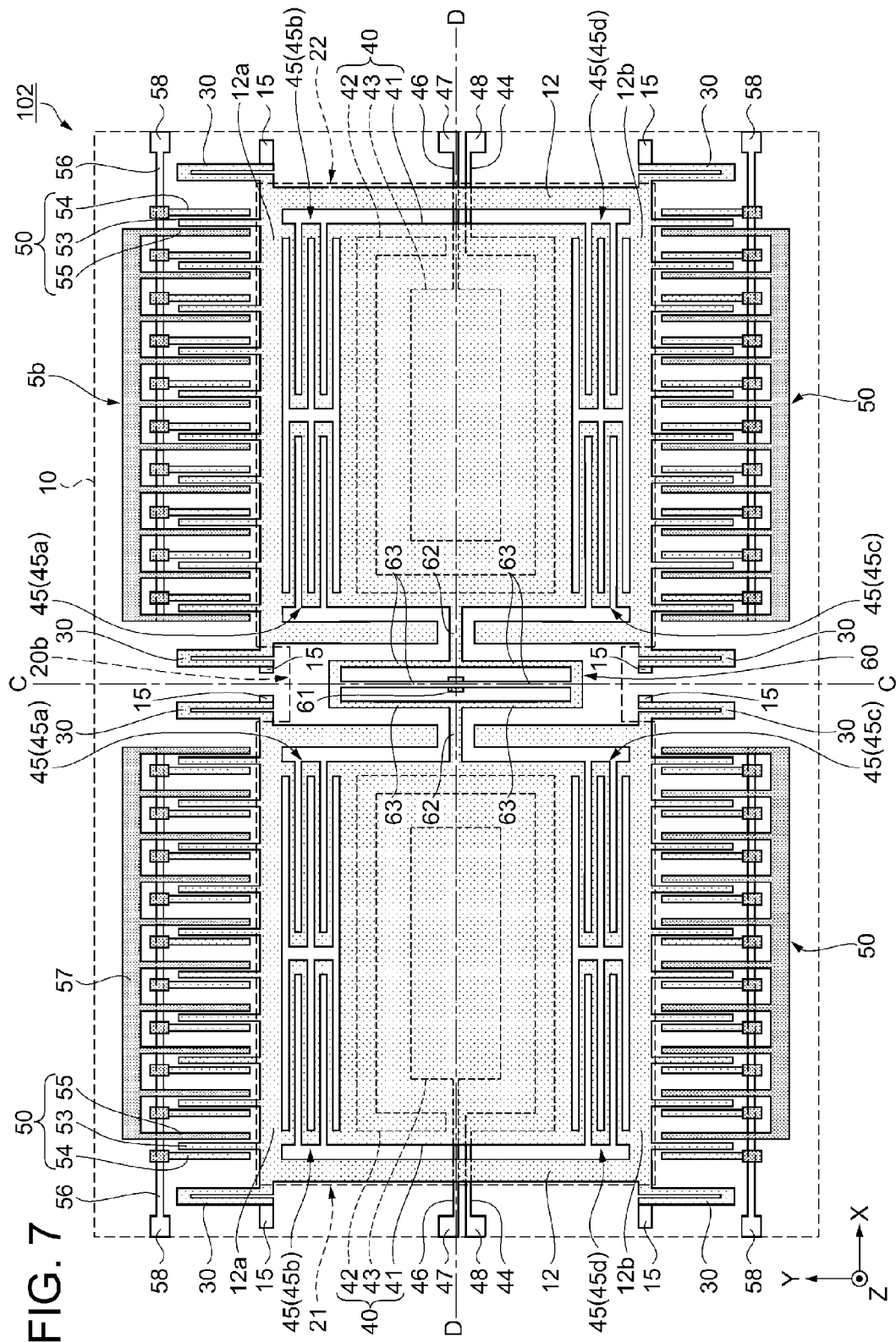
FIG. 7 is a plan view schematically showing a gyro sensor according to a second embodiment of the invention.
Figure 8:
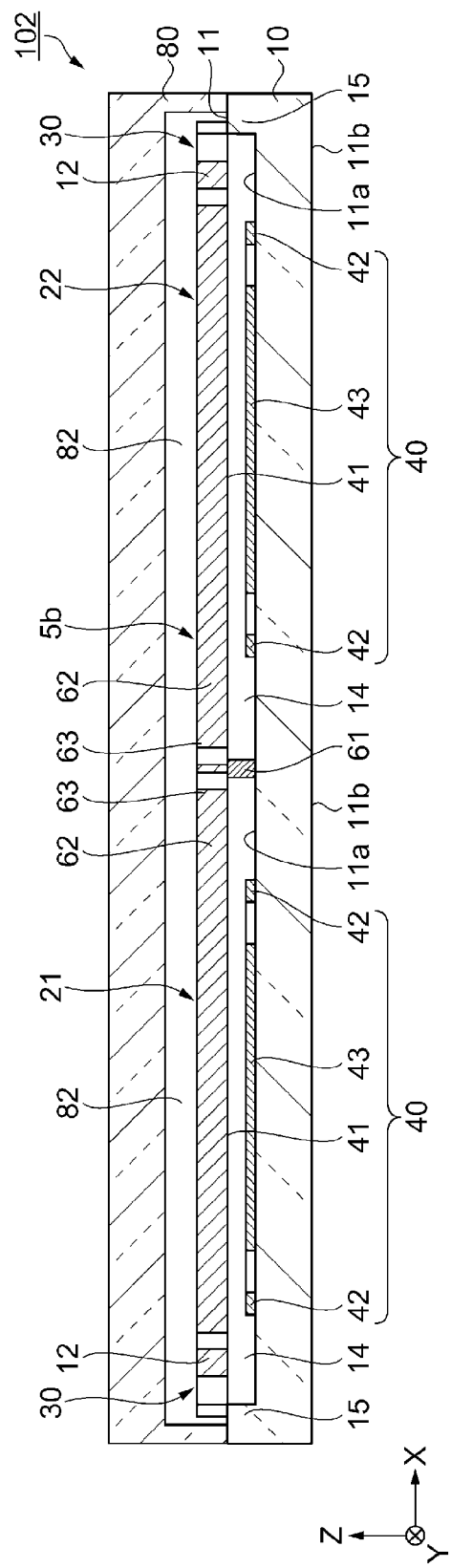
FIG. 8 is a cross-sectional view schematically showing the gyro sensor according to the second embodiment.

A gyro sensor according to a second embodiment of the invention as an electronic device using a gyro element as a functional element will be explained with reference to the accompanying drawings. FIG. 7 is a plan view schematically showing the gyro sensor 102 according to the second embodiment. FIG. 8 is a cross-sectional view along the A-A line shown in FIG. 7 and schematically showing the gyro sensor 102 according to the second embodiment. It should be noted that in FIGS. 7 and 8, the X axis (a first direction), the Y axis (a second direction), and the Z axis (a third direction) are shown as three axes perpendicular to each other. Further, hereinafter the constituents substantially the same as those of the first embodiment described above will be denoted with the same reference symbols, and the explanation thereof will be omitted.

As shown in FIGS. 7 and 8, the gyro sensor 102 according to the second embodiment includes the base body 10 and a gyro element 5b as the functional element. The gyro element 5b as the functional element includes a vibrating body 20b, the detection coupling sections 30, and the detection sections 50. It should be noted that the vibrating body 20b is provided with a first vibrating body 21 and a second vibrating body 22 arranged side by side along the X-axis direction. The gyro element 5b is housed in the cavity 82 surrounded by the base body 10 and the lid body 80. The gyro element 5b is disposed above the base body 10 via the gap (the recessed section 14). The gyro element 5b is supported by the fixation sections 15 provided to the first surface 11 of the base body 10 (on the base body 10) via the detection coupling sections 30. In the gyro sensor 102, the detection sections 50 constituting the gyro element 5b each correspond to the gyro sensor element (the capacitive MEMS gyro sensor element) for detecting the angular velocity around the Y axis. It should be noted that in FIG. 7, the graphical description is presented seeing through the base body 10 and the lid body 80 for the sake of convenience. Further, a view from the normal direction of the first surface 11 (see FIG. 8) as the base surface of the base body 10 on which the vibrating body 20b is disposed, namely viewing the vibrating body 20b supported by the base body 10 from above, is hereinafter referred to as a "planar view."

The material of the base body 10 is, for example, glass or silicon. As shown in FIG. 8, the base body 10 has the first surface 11, and the second surface 11b on the opposite side to the first surface 11. The first surface 11 is provided with the recessed section 14. Above the recessed section 14, there are disposed the vibrating body 20b (the first vibrating body 21, the second vibrating body 22, and a vibrating body coupling section 60), the detection coupling sections 30, and the detection sections 50 via a gap. Due to the recessed section 14, the vibrating body 20*b* can move in a desired direction without being hindered by the base body 10. The planar shape (the shape viewed from the Z-axis direction) of the recessed section 14 is not particularly limited, but is a rectangular shape in the example shown in FIG. 7. The recessed section 14 is formed using, for example, a photolithography process and an etching process.

As shown in FIG. 8, the base body 10 has the fixation sections 15 arbitrarily provided to the first surface 11 in accordance with the configuration of the vibrating body 20*b*. The fixation sections 15 are each a part, to which one end of the detection coupling section 30 for supporting the vibrating body 20*b* is fixed (bonded), and which supports the vibrating body 20*b* via the detection coupling section 30. As shown in FIG. 7, the fixation sections 15 can also be disposed respectively across the first vibrating body 21 and the second vibrating body 22 from each other in the X-axis direction. Further, the fixation sections 15 can also be disposed respectively across the first vibrating body 21 and the second vibrating body 22 from each other in the Y-axis direction. In other words, the fixation sections 15 can also be disposed at four places, or at eight places.

Further, the base body 10 has a second fixation section 61 provided to the first surface 11 in accordance with the configuration of the vibrating body 20*b*. The second fixation sections 61 is a part, to which one end of an elastic body 63 constituting the vibrating body coupling section 60 of the vibrating body 20*b* is fixed (bonded), and which supports the vibrating body coupling section 60 via the elastic body 63. The second fixation section 61 is disposed so as to support at least the elastic body 63.

The method of fixing (bonding) the first surface 11 (the base body 10) of the fixation sections 15 and the second fixation section 61 to the detection coupling sections 30, the first detecting stationary electrodes 54, the second detecting stationary electrodes 55, and so on described later is not particularly limited, but in the case in which the material of the base body 10 is glass, and the material of the vibrating body 20*b* and so on is silicon, anodic bonding can be applied.

The first vibrating body 21 and the second vibrating body 22 constituting the vibrating body 20*b* are arranged side by side in a direction (a first axis direction) along the X axis, and is coupled to each other with the vibrating body coupling section 60. Further, the first vibrating body 21 and the second vibrating body 22 are supported by the fixation sections 15 via the detection coupling sections 30, and are disposed so as to be separated from the base body 10. More specifically, the first vibrating body 21 and the second vibrating body 22 are disposed above the base body 10 via the gap (the recessed section 14). The first vibrating body 21 and the second vibrating body 22 are each provided with, for example, the support body 12 having a frame-like shape (a square shape). As shown in FIG. 7, it is also possible for the first vibrating body 21 and the second vibrating body 22 to have shapes symmetric about a boundary line C-C (a line disposed along the Y axis) between the first vibrating body 21 and the second vibrating body 22. The material of the vibrating body 20*b* is, for example, silicon provided with electrical conductivity by doping impurities such as phosphorus or boron. The vibrating body 20*b* is formed by, for example, processing a silicon substrate (not shown) using a photolithography process and an etching process.

The vibrating body coupling section 60 is configured so that the mass sections 41 in the first vibrating body 21 and the second vibrating body 22 can be displaced in the Z-axis direction. More specifically, the vibrating body coupling section 60 has coupling beam sections 62 extending from the respective mass sections 41 in the direction along the X axis, and the elastic body 63 extending from end portions of the respective coupling beam sections 62 in directions along the Y axis and reciprocating in the Y-axis direction in an area between the first vibrating body 21 and the second vibrating body 22. Thus, the first vibrating body 21 and the second vibrating body 22 can vibrate in the Z-axis direction in respective phases opposite to each other.

The elastic body 63 extends from the coupling beam sections 62 in directions along the Y axis so as to form a plurality of beam-like shapes, and is fixed (bonded) to the second fixation section 61. Specifically, as shown in FIG. 7, one end of the central beam of the elastic body 63 is bonded (fixed) to the second fixation section 61 (the first surface 11 of the base body 10). The configuration of the elastic body 63 is not limited as long as the elastic body 63 can elastically deform in directions (directions in which the vibrating body 20*b* vibrates) along the Z axis at a predetermined spring constant.

The detection coupling sections 30 are each configured so that the vibrating body 20*b* can be displaced in the X-axis direction. More specifically, the detection coupling sections 30 each have a shape extending in the X-axis direction from the fixation section 15 to the vibrating body 20*b* (the first vibrating body 21 or the second vibrating body 22) while reciprocating in the Y-axis direction. One end of each of the detection coupling sections 30 is bonded (fixed) to the fixation section 15 (the first surface 11 of the base body 10). Further, the other end of each of the detection coupling sections 30 is connected to the support body 12 of the vibrating body 20*b* (the first vibrating body 21 or the second vibrating body 22). In the example shown in the drawings, there are disposed eight detection coupling sections 30 respectively across the first vibrating body 21 and the second vibrating body 22 from each other in the X-axis direction.

The material of the detection coupling sections 30 is, for example, silicon provided with electrical conductivity by doping impurities such as phosphorus or boron. The detection coupling sections 30 are formed by, for example, processing a silicon substrate (not shown) integrally with the vibrating body 20*b* using a photolithography process and an etching process.

Further, the spring constant in the Z-axis direction of the detection coupling sections 30 is set to be higher than the spring constant in the Z-axis direction of the drive coupling sections 45. By setting the spring constant in the Z-axis direction of the detection coupling sections 30 to be higher than the spring constant in the Z-axis direction of the drive coupling sections 45 as described above, it becomes possible to inhibit the support body 12 (the first support section 12*a*, the second support section 12*b*) from vibrating in the Z-axis direction.

The drive section 40 is disposed on the inner side of the support body 12 of each of the first vibrating body 21 and the second vibrating body 22 in the planar view. The drive section 40 has a mechanism capable of exciting the vibration of the mass section 41 of the vibrating body 20*b*, and is provided with the mass section 41 connected to the support body 12 via the drive coupling sections 45, the drive electrode 42 disposed on the base body 10 at a position opposed to the mass section 41 so as to have a frame-like shape, and the drive monitor electrode 43 disposed on the base body 10 on the inner side of the drive electrode 42 having the frame-like shape so as to be opposed to the mass section 41. It should be noted that since the drive coupling sections 45, the mass section 41, the drive electrode 42, and the drive monitor electrode 43 constituting the drive section 40 are the same as those of the first embodiment described above, the detailed explanation of the configuration and the advantage thereof will be omitted.

The detection sections 50 are disposed on the outer side of the vibrating body 20b (the first vibrating body 21 and the second vibrating body 22). In other words, the detection sections 50 are disposed on the opposite side to the side, on which the vibrating body 20b is disposed, with respect to the first support section 12a or the second support section 12b provided to each of the first vibrating body 21 and the second vibrating body 22. The detection sections 50 each have the detecting movable electrodes 53 as the movable electrodes connected to the first support section 12a or the second support section 12b, the first detecting stationary electrodes 54 and the second detecting stationary electrodes 55 as the detecting stationary electrodes. It should be noted that since the detecting movable electrodes 53, the first detecting stationary electrodes 54, and the second detecting stationary electrodes 55 constituting the detection section 50 are the same as those of the first embodiment described above, the detailed explanation of the configuration and the advantage thereof will be omitted.

The lid body 80 is disposed on the base body 10. The base body 10 and the lid body 80 can constitute a package as shown in FIG. 8. The base body 10 and the lid body 80 can form the cavity 82, and it is possible to house the gyro element 5b including the vibrating body 20b and so on in the cavity 82. The cavity 82 can be sealed in, for example, an inert gas (e.g., a nitrogen gas) atmosphere, or a vacuum atmosphere.

The material of the lid body 80 is, for example, silicon or glass. The method of bonding the lid body 80 and the base body 10 to each other is not particularly limited, but in the case in which, for example, the material of the base body 10 is glass, and the material of the lid body 80 is silicon, the base body 10 and the lid body 80 can anodically be bonded to each other. Further, the bonding portion between the base body 10 and the lid body 80 can be filled with an adhesive material or the like.

1-4. Operation of Gyro Sensor According to Second Embodiment

Then, an operation of the gyro sensor 102 will be explained with reference to the drawings. FIGS. 9A, 9B, 10A, 10B, 11A, 11B, 12A, and 12B are diagrams for schematically explaining the operation of the gyro sensor 102. It should be noted that in FIGS. 9A, 9B, 10A, 10B, 11A, 11B, 12A, and 12B, the X axis, the Y axis, and the Z axis are shown as the three axes perpendicular to each other. Further, in FIGS. 9A, 9B, 10A, 10B, 11A, 11B, 12A, and 12B, each of the constituents of the gyro sensor 102 is shown in a simplified manner for the sake of convenience. Further, in FIGS. 9A, 9B, 10A, and 10B, among the detection sections 50, those located on the first vibrating body 21 side are referred to as first detection sections 50a, and those located on the second vibrating body 22 side are referred to as second detection sections 50b.

As described above, in the vibration mode of the gyro sensor 102, the first vibrating body 21 and the second vibrating body 22 are excited by the drive section 40, and can perform the drive vibrations in respective phases opposite (reverse) to each other. More specifically, a first alternating voltage is applied between the mass section 41 and the drive electrode 42 provided to the first vibrating body 21, and a second alternating voltage having a phase 180 degrees shifted from that of the first alternating voltage is applied between the mass section 41 and the drive electrode 42 of the second vibrating body 22. Thus, it is possible to vibrate the first vibrating body 21 and the second vibrating body 22 in respective phases opposite (reverse) to each other at a predetermined frequency along the Z axis. In other words, the first vibrating body 21 and the second vibrating body 22 connected to each other along the X axis vibrate along the Z axis in the respective phases opposite to each other. In other words, the first vibrating body 21 and the second vibrating body 22 are displaced along the Z axis in respective directions opposite to each other.

In the example shown in FIGS. 9A and 9B, the first drive vibrating body 21 is displaced in the α1 direction (+Z-axis direction), and the second vibrating body 22 is displaced in the α2 direction (−Z-axis direction) opposite to the α1 direction. In the example shown in FIGS. 10A and 10B, the first vibrating body 21 is displaced in the α2 direction, and the second vibrating body 22 is displaced in the α1 direction.

As shown in FIGS. 11A, 11B, 12A, and 12B, if the angular velocity ω around the Y axis is applied to the gyro sensor 102 in the state in which the mass sections 41 in the first vibrating body 21 and the second vibrating body 22 are vibrating along the Z axis, the Coriolis force acts on the mass sections 41, and the support bodies 12 (the first support sections 12a, the second support sections 12b) and the detecting movable electrodes 53 disposed so as to extend from the respective support bodies 12 are also displaced along the X-axis direction accordingly via the drive coupling sections 45. In other words, the detecting movable electrodes 53 coupled to the first vibrating body 21 and the detecting movable electrodes 53 coupled to the second vibrating body 22 are displaced along the X axis in respective directions opposite to each other. In the example shown in FIGS. 11A and 11B, the detecting movable electrodes 53 on the first detection section 50a side are displaced in a β1 direction, and the detecting movable electrodes 53 on the second detection section 50b side are displaced in a β2 direction opposite to the β1 direction. In the example shown in FIGS. 12A and 12B, the detecting movable electrodes 53 on the first detection section 50a side are displaced in the β2 direction, and the detecting movable electrodes 53 on the second detection section 50b side are displaced in the β1 direction.

By the detecting movable electrodes 53 on the first detection section 50a side and the detecting movable electrodes 53 on the second detection 50b side being displaced along the X axis, the distance between the detecting movable electrodes 53, and the first detecting stationary electrodes 54 or the second detecting stationary electrodes 55 varies. Therefore, the capacitance between the detection movable electrodes 53, and the first detecting stationary electrodes 54 and the second detecting stationary electrodes 55 varies. In the gyro sensor 102, by applying a voltage to the detecting movable electrodes 53, and the first detecting stationary electrodes 54 and the second detecting stationary electrodes 55, it is possible to detect the variation in the capacitance between the detecting movable electrodes 53, and the first detecting stationary electrodes 54 and the second detecting stationary electrodes 55 to obtain the angular velocity ω around the Y axis.

According to the gyro sensor 102 related to the second embodiment, the following advantages can be obtained in addition to the advantages of the gyro sensor 100 according to the first embodiment described above. In the gyro sensor 102 according to the second embodiment, the two vibrating bodies, namely the first vibrating body 21 and the second vibrating body 22, are arranged side by side via the vibrating body coupling section 60. By making the vibrating bodies (the first vibrating body 21 and the second vibrating body 22) arranged in such a manner as described above perform the drive vibration in the respective directions opposite to each other, and then calculating the angular velocity based on measurement values measured for the respective vibrating bodies, it becomes possible to cancel out the acceleration applied linearly. Therefore, it becomes possible for the gyro sensor 102 to more accurately detect the angular velocity ω around the Y axis without being affected by the acceleration.

Further, in the gyro sensor 102, the elastic body 63 can elastically deform in the vibration directions of the first vibrating body 21 and the second vibrating body 22, and can therefore support the vibrating body coupling section 60 without hindering the vibration energy exchange between the first vibrating body 21 and the second vibrating body 22.

According to the gyro sensor 102, by providing the elastic body 63 fixed (anchored) to the second fixation section 61, it is possible to separate the common-mode drive frequency away from the reverse-phase-mode drive frequency in the vibration mode of the drive system. Thus, it becomes possible to suppress generation of the common-mode vibration in the gyro sensor 102.

1-5. Configuration of Gyro Sensor According to Modified Example

Figure 13:
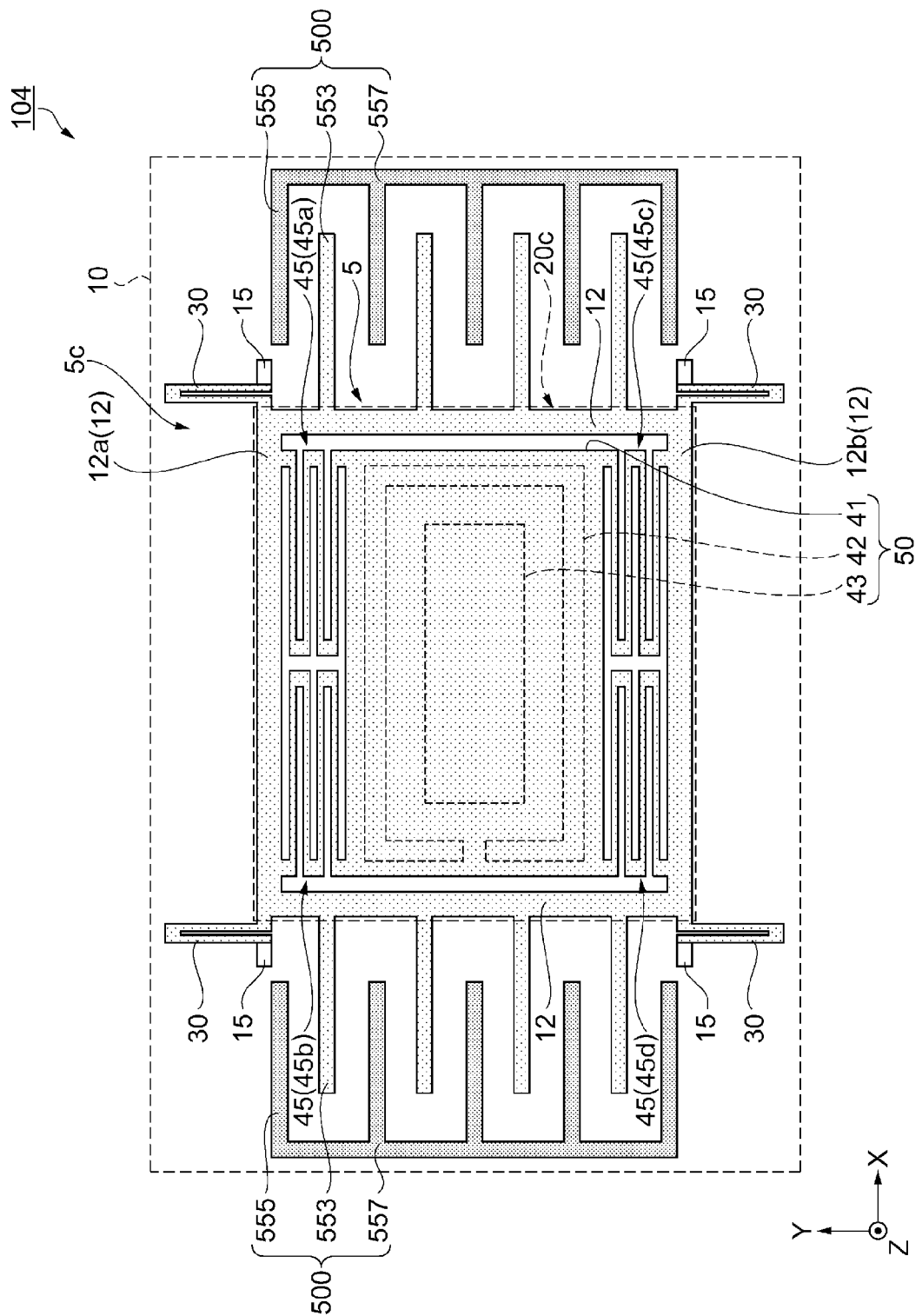
FIG. 13 is a plan view for explaining an operation of a gyro sensor according to a modified example.

A gyro sensor according to a modified example using the functional element according to the invention will be explained with reference to the accompanying drawing. FIG. 13 is a plan view schematically showing the gyro sensor 104 according to the modified example, and is a diagram showing the same state viewed from the same direction as in FIG. 1. The gyro sensor 104 according to the present modified example has a configuration different in the arrangement position of the detection section constituting the gyro element from the gyro sensor 100 according to the first embodiment described above. Therefore, the explanation here is presented with a focus on the arrangement of the detection section, and the constituents substantially the same as those of the first embodiment will be denoted with the same reference symbols, and the explanation thereof will be omitted.

As shown in FIG. 13, the gyro sensor 104 according to the modified example includes the base body 10 and a gyro element 5c as the functional element. The gyro element 5c as the functional element includes a vibrating body 20c, the detection coupling sections 30, and detection sections 500. In the gyro element 5c, the detection sections 500 each correspond to a gyro sensor element (a capacitive MEMS gyro sensor element) for detecting the angular velocity around the Y axis.

The detection sections 500 are each disposed on the outer side of apart located along the Y axis out of the support body 12 having a frame-like shape constituting the vibrating body 20c, namely on an opposite side to the side, on which the vibrating body 20c is disposed, with respect to the support body 12. The detection sections 500 each have detecting movable electrodes 553 as the movable electrodes, and detecting stationary electrodes 555.

The detecting movable electrodes 553 are each disposed so as to extend outward (in the X-axis direction) from the support body 12 disposed along the Y axis to have a thin-width shape (a rectangular rod shape) along the X-axis direction. The number of the detecting movable electrodes 553 is two or more, and the detecting movable electrodes 553 are arranged side by side with gaps in the Y-axis direction. It should be noted that the number of the detecting movable electrodes 553 is not particularly limited.

The detecting stationary electrodes 555 are disposed on both sides in the Y-axis direction of the detecting movable electrode 553 intervening therebetween so as to extend in the X-axis direction while being opposed to the detecting movable electrode 553. The detecting stationary electrodes 555 are bonded (fixed) to the first surface 11 (not shown) of the base body 10. In the example shown in the drawing, the plurality of detecting stationary electrodes 555 is disposed so as to correspond to the detecting movable electrodes 553, and the detecting stationary electrodes 555 are disposed so as to be opposed to each other via the corresponding detecting movable electrode 553. In other words, the detecting stationary electrodes 555 are arranged so as not to overlap the detecting movable electrodes 553 in the planar view. Further, the detecting stationary electrodes 555 are connected to each other with a detection connecting sections 557 disposed on the outer side in the X-axis directions of the detecting movable electrodes 553, and are then electrically connected to an external terminal not shown.

As described above, since the detection sections 500 each have the detecting movable electrodes 553 extending from the support body 12 along the X-axis direction, and the detecting stationary electrodes 555 bonded to the base body 10 along the X-axis direction, the detection sections 500 can efficiently detect the vibration (displacement) of the vibrating body 20c in the X-axis direction generated when the angular velocity acts thereon.

In the case in which a Coriolis force corresponding to the angular velocity is exerted on the mass section 41, the detection sections 500 can detect the vibration in the X-axis direction generated in the mass section 41 using the capacitance variation to calculate the Coriolis force corresponding to the angular velocity. Specifically, when the Coriolis force is exerted on the mass section 41 in the X-axis direction, the support body 12 and the detecting movable electrodes 553 extending from the support body 12 also vibrate in the X-axis direction accordingly via the drive coupling sections 45. Thus, it is possible to detect the capacitance variation due to a variation in the opposed area generated between the detecting movable electrodes 553 and the detecting stationary electrodes 555 to calculate the capacitance variation as the angular velocity.

2. Method of Manufacturing Gyro Sensor

Figure 14A:
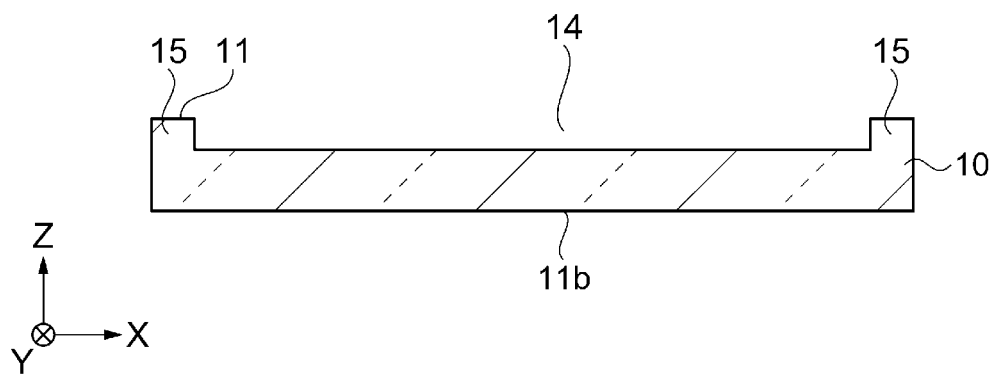
FIGS. 14A and 14B are cross-sectional views schematically showing a manufacturing process of a gyro sensor.
Figure 14B:
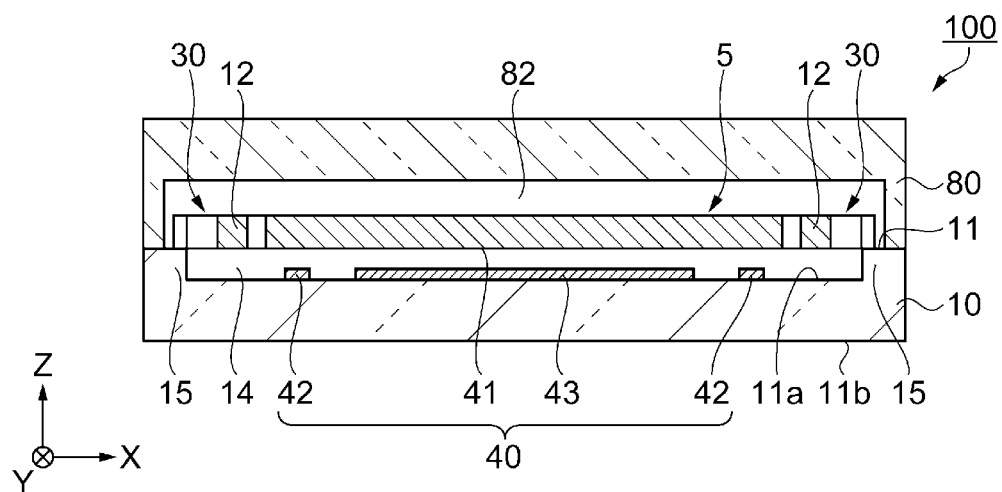

Then, a method of manufacturing the gyro sensor according to the embodiment described above will briefly be explained with reference to FIGS. 14A and 14B. It should be noted that FIGS. 14A and 14B are cross-sectional views schematically showing a manufacturing process of the gyro sensor 100 according to the first embodiment, and FIG. 14B corresponds to FIG. 2.

Firstly, the recessed section 14 is formed in the first surface 11 of the substrate (the base body 10). On this occasion, it is possible to form a groove section (not shown) in the periphery of the recessed section 14. The recessed section 14, and the groove section are formed using, for example, a photolithography process and an etching process. Thus, it is possible to prepare the base body 10 provided with the recessed section 14 in the first surface 11.

Then, although not shown in the drawings, electrodes and wiring lines for constituting the drive section 40 and detection sections 50 are formed on the base body 10 including the inside of the recessed section 14. The wiring lines are formed by, for example, being deposited by a sputtering method or a chemical vapor deposition (CVD) method, and then being patterned using a photolithography process and an etching process.

Subsequently, the vibrating body 20, the detection coupling sections 30, the detecting sections 50 (see FIG. 1), and so on are formed on the base body 10. More specifically, these constituents are formed by mounting (bonding) a silicon substrate (not shown) on the first surface 11 of the base body 10, then forming the silicon substrate as a thin film, and then patterning the silicon substrate. The patterning process is performed using the photolithography process and the etching process. Bonding between the silicon substrate and the base body 10 is achieved by, for example, anodic bonding.

Then, the base body 10 and the lid body 80 are bonded to each other, and the vibrating body 20 is housed in the cavity 82 surrounded by the base body 10 and the lid body 80. Bonding between the base body 10 and the lid body 80 is achieved by, for example, anodic bonding.

According to the process described hereinabove, the gyro sensor 100 can be manufactured. It should be noted that the gyro sensors 102, 104 described above can also be manufactured using substantially the same process as described above.

Further, although in the above description, the gyro elements 5, 5b, and 5c used for the gyro sensors 100, 102, and 104 for detecting the angular velocity are explained as an example of the functional element, the functional element is not limited to the example. The configuration of the functional element is not particularly limited as long as the functional element operates in the cavity 82 sealed in a reduced pressure state or an inert gas atmosphere, and there can be cited a variety of types of functional elements such as an acceleration detection element used for an acceleration sensor, a pressure detection element used for a pressure gauge, a vibrator, or a microactuator.

3. Electronic Apparatus

Then, an electronic apparatus according to the present embodiment will be explained with reference to the accompanying drawings. The electronic apparatus according to the present embodiment includes either one of the gyro sensors 100, 102, and 104 according to the invention. Hereinafter, the electronic apparatus including the gyro sensor 100 according to the invention will be explained as an example.

Figure 15:
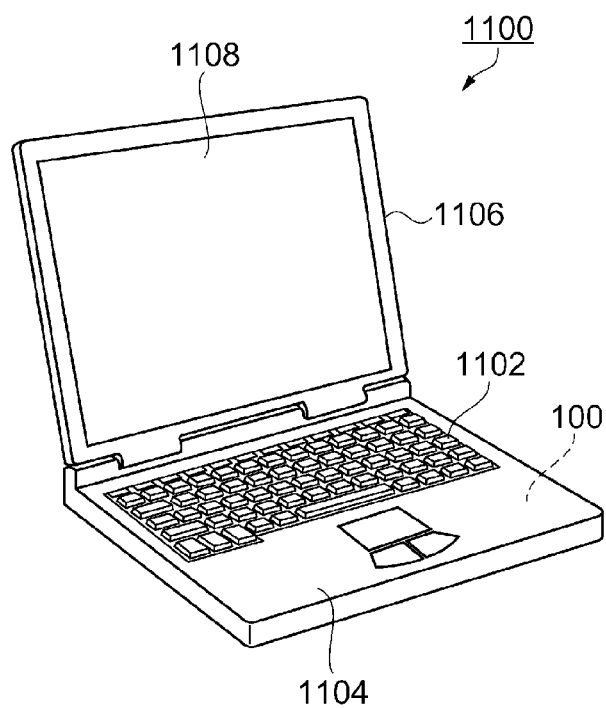
FIG. 15 is a perspective view schematically showing a configuration of a mobile personal computer as an example of the electronic apparatus.

FIG. 15 is a perspective view schematically showing a mobile type (or laptop type) personal computer 1100 as the electronic apparatus according to the present embodiment. As shown in FIG. 15, the personal computer 1100 is composed of a main body section 1104 equipped with a keyboard 1102, and a display unit 1106 equipped with a display section 1108, and the display unit 1106 is pivotally supported with respect to the main body section 1104 via a hinge structure. Such a personal computer 1100 incorporates the gyro sensor 100.

Figure 16:
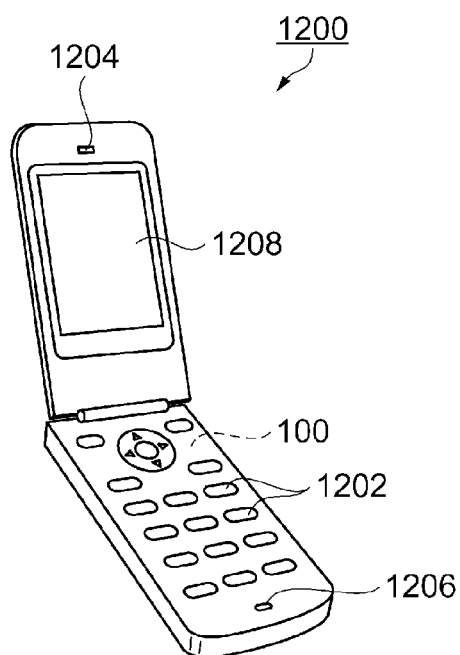
FIG. 16 is a perspective view schematically showing a configuration of a cellular phone as an example of the electronic apparatus.

FIG. 16 is a perspective view schematically showing a cellular phone (including PHS) 1200 as the electronic apparatus according to the present embodiment. As shown in FIG. 16, the cellular phone 1200 is provided with a plurality of operation buttons 1202, an ear piece 1204, and a mouthpiece 1206, and a display section 1208 is disposed between the operation buttons 1202 and the ear piece 1204. Such a cellular phone 1200 incorporates the gyro sensor 100.

Figure 17:
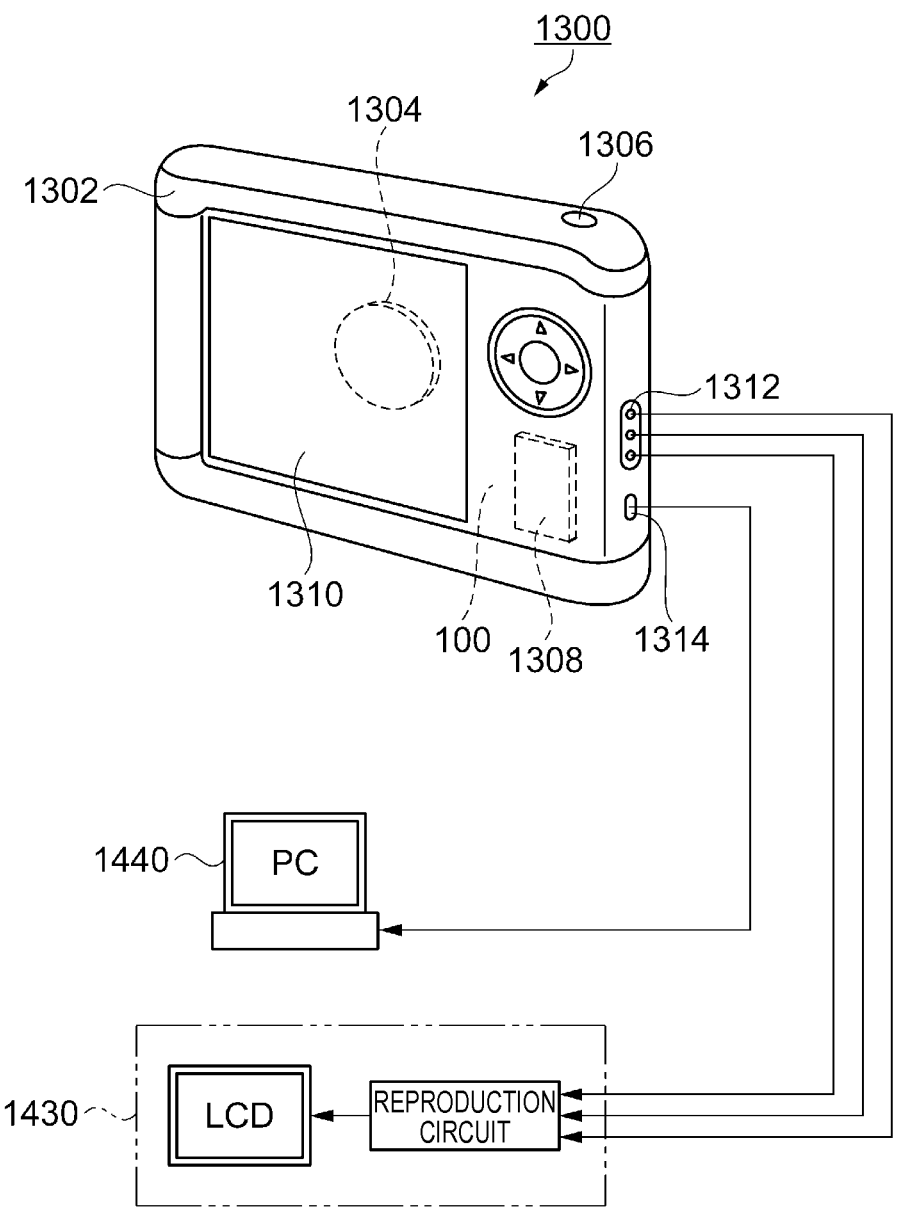
FIG. 17 is a perspective view schematically showing a configuration of a digital still camera as an example of the electronic apparatus.

FIG. 17 is a perspective view schematically showing a digital still camera 1300 as the electronic apparatus according to the present embodiment. It should be noted that FIG. 17 also shows the connection with external equipment schematically. Here, existing cameras expose silver salt films to optical images of objects, while the digital still camera 1300 performs photoelectric conversion on optical images of objects by imaging elements such as CCD (charge coupled device) to generate imaging signals (image signals).

A case (a body) 1302 of the digital still camera 1300 is provided with a display section 1310 disposed on the back surface of the case 1302 to provide a configuration of performing display in accordance with the imaging signal from the CCD, wherein the display section 1310 functions as a viewfinder for displaying the object as an electronic image. Further, the front surface (the back side in the drawing) of the case 1302 is provided with a light receiving unit 1304 including an optical lens (an imaging optical system), the CCD, and so on. When the photographer checks an object image displayed on the display section 1310, and then holds down a shutter button 1306, the imaging signal from the CCD at that moment is transferred to and stored in a memory device 1308.

Further, the digital still camera 1300 is provided with video signal output terminals 1312 and an input/output terminal 1314 for data communication disposed on a side surface of the case 1302. Further, a television monitor 1430 and a personal computer 1440 are connected to the video signal output terminals 1312 and the input-output terminal 1314 for data communication, respectively, according to needs. Further, there is adopted the configuration in which the imaging signal stored in the memory device 1308 is output to the television monitor 1430 and the personal computer 1440 in accordance with a predetermined operation. Such a digital still camera 1300 incorporates the gyro sensor 100.

The personal computer 1100, the cellular phone 1200, the digital still camera 1300 as the electronic apparatus described above can be provided with the gyro sensor 100 not hindering the vibration energy exchange between two vibrating bodies and capable of preventing the deterioration of the characteristics due to the capacitance coupling in the drive system having the two vibrating bodies vibrating in respective phases opposite to each other.

It should be noted that, as the electronic apparatus provided with the gyro sensor 100 described above, there can be cited, for example, an inkjet ejection device (e.g., an inkjet printer), a laptop personal computer, a television set, a video camera, a head-mounted display, a video cassette recorder, a variety of types of car navigation system, a pager, a personal digital assistance (including one with a communication function), an electronic dictionary, an electric calculator, a computerized game machine, a word processor, a workstation, a video phone, a security video monitor, a pair of electronic binoculars, a POS terminal, medical equipment (e.g., an electronic thermometer, an electronic manometer, an electronic blood sugar meter, an electrocardiogram measurement instrument, an ultrasonograph, and an electronic endoscope), a fish detector, a variety of types of measurement instruments, a variety of types of gauges (e.g., gauges for a vehicle, an aircraft, a rocket or a ship), a posture controller for a robot or a human body, and a flight simulator in addition to the personal computer 1100 (the mobile personal computer) shown in FIG. 15, the cellular phone 1200 shown in FIG. 16, and the digital still camera 1300 shown in FIG. 17.

4. Moving Object

Figure 18:
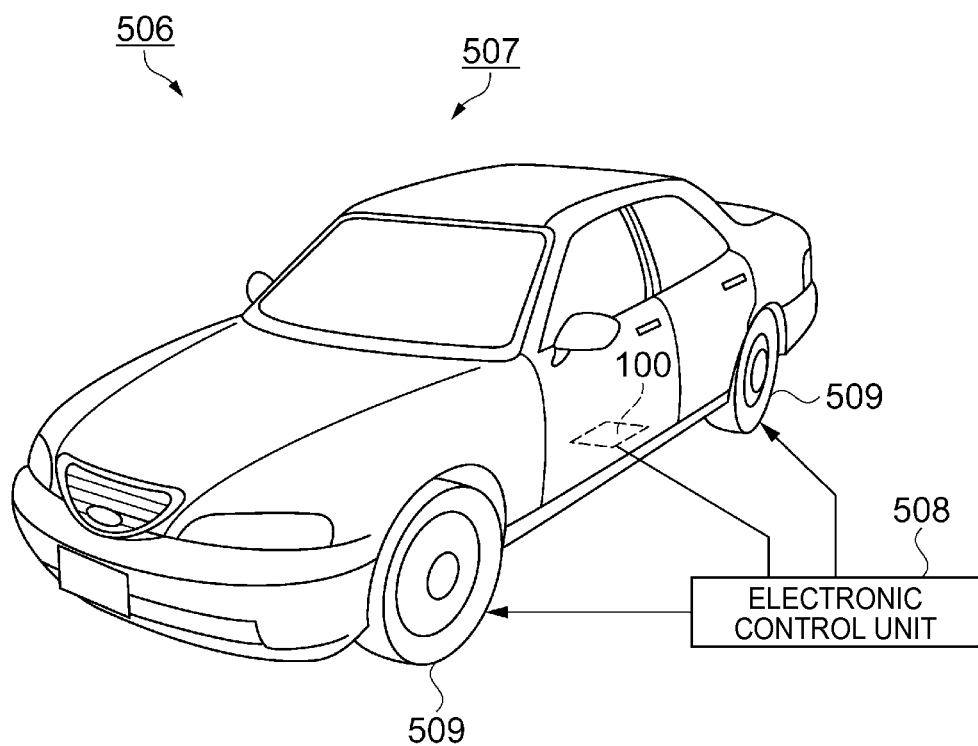
FIG. 18 is a perspective view schematically showing a configuration of a vehicle as an example of a moving object.

FIG. 18 is a perspective view schematically showing a vehicle as an example of a moving object according to the present embodiment. The vehicle 506 is equipped with the gyro sensor 100 using the functional element (the gyro element 5) according to the invention. For example, as shown in the drawing, in the vehicle 506 as the moving object, an electronic control unit 508 incorporating the gyro sensor 100 using the functional element (the gyro element 5), and for controlling tires 509 and so on is installed in a vehicle body 507. Further, besides the above, the gyro sensor 100 can widely be applied to an electronic control unit (ECU) such as a keyless entry system, an immobilizer, a car navigation system, a car air-conditioner, an anti-lock braking system (ABS), an air-bag system, a tire pressure monitoring system (TPMS), an engine controller, a battery monitor for a hybrid car or an electric car, or a vehicle attitude control system.

The embodiments described above are each nothing more than an example, and the invention is not limited thereto. For example, it is also possible to arbitrarily combine the embodiments described above.

The invention includes configurations (e.g., configurations having the same function, the same way, and the same result, or configurations having the same object and the same advantages) substantially the same as the configuration described as the embodiments of the invention. Further, the invention includes configurations obtained by replacing a non-essential part of the configuration described as the embodiment of the invention. Further, the invention includes configurations exerting the same functional effects and configurations capable of achieving the same object as the configuration described as one of the embodiments of the invention. Further, the invention includes configurations obtained by adding known technologies to the configuration described as one of the embodiments of the invention.

What is claimed is:

1. A functional element comprising:
    a support body;
    a detection section that is connected to the support body and that is configured to detect a vibration in a direction along a first axis, the detection section having a first detection end and a second detection end opposite to the first detection end, the first axis being perpendicular to second and third axes, the second axis being perpendicular to the third axis;
    a plurality of drive coupling sections, each of the plurality of drive coupling sections being configured with a first part and a second part which is directly connected to the first part, the first part extending along the first axis, the first part having first and second coupling ends opposite to each other, the second part extending along the second axis, wherein the first coupling ends of the first parts are connected to the first and second detection ends of the detection section; and
    a mass section connected to the support body via the plurality of drive coupling sections, the mass section having a first mass end and a second mass end opposite to the first mass end, the second coupling ends of the first parts being connected to the first and second mass ends,
    wherein the mass section is configured to vibrate along the third axis, and the vibration along the third axis being a drive vibration, and
    the plurality of drive coupling sections are configured to prevent a vibration of the mass section in a direction along the first axis from transferring to the detection section via the support body.

2. The functional element according to claim 1, further comprising:
    a base body,
    wherein the detection section includes
        a detecting movable electrode extending from the support body along the second axis, and
        a detecting stationary electrode, which is opposed to the detecting movable electrode, extends along the second axis, and is supported by the base body.

3. The functional element according to claim 2, further comprising:
    a drive electrode adapted to make the mass section perform the drive vibration; and
    a drive monitor electrode adapted to monitor the vibration of the mass section,
    wherein the drive electrode and the drive monitor electrode are each at least partially opposed to the mass section, and are supported by the base body.

4. The functional element according to claim 1, wherein two of the plurality of drive coupling sections are disposed side by side along the first axis.

5. The functional element according to claim 1, wherein the plurality of drive coupling sections include a first drive coupling section and a second drive coupling section,
    the second coupling end of the first part of the first drive coupling section is connected to the first mass end of the mass section, and
    the second coupling end of the first part of the second drive coupling section is connected to the second mass end of the mass section on an opposite side to the first mass end.

6. The functional element according to claim 1, wherein the plurality of drive coupling sections are configured to satisfy a relationship of (a spring constant in the direction along the third axis)<(a spring constant in the direction along the first axis).

7. The functional element according to claim 1, wherein the plurality of drive coupling sections are configured to satisfy a relationship of (a spring constant in the direction along the second axis)<(a spring constant in the direction along the first axis).

8. The functional element according to claim 1, further comprising:
    a second vibrating body arranged side by side with a first vibrating body in the direction along the first axis, the first vibrating body being configured with the support body, the plurality of drive coupling sections, and the mass section, the second vibrating body including:
        a second support body;
        a second mass; and
        a plurality of second drive coupling sections, the second mass being connected to the second support body via the plurality of second drive coupling sections; and
    a vibrating body coupling section disposed between the first vibrating body and the second vibrating body to connect the first vibrating body and the second vibrating body to each other.

9. The functional element according to claim 8, wherein the second vibrating body includes
    a base body;
    a drive electrode adapted to make the second mass section perform the drive vibration, and
    a drive monitor electrode adapted to monitor the vibration of the second mass section, and the drive electrode and the drive monitor electrode are each at least partially opposed to the second mass section, and are disposed on the base body.

10. The functional element according to claim 1, further comprising:
a detection coupling section, which extends from the support body, and the detection coupling section being expandable and contractible along the first axis,
wherein a spring constant in the direction along the third axis of the detection coupling section is higher than a spring constant in the direction along the third axis of the plurality of drive coupling sections.

11. An electronic device comprising:
a functional element, the functional element includes:
a support body;
a detection section that is connected to the support body and that is configured to detect a vibration in a direction along a first axis, the detection section having a first detection end and a second detection end opposite to the first detection end, the first axis being perpendicular to second and third axes, the second axis being perpendicular to the third axis;
a plurality of drive coupling sections, each of the plurality of drive coupling sections being configured with a first part and a second part which is directly connected to the first part, the first part extending along the first axis, the first part having first and second coupling ends opposite to each other, the second part extending along the second axis, wherein the first coupling ends of the first parts are connected to the first and second detection ends of the detection section; and
a mass section connected to the support body via the plurality of drive coupling sections, the mass section having a first mass end and a second mass end opposite to the first mass end, the second coupling ends of the first parts being connected to the first and second mass ends; and
a package housing the functional element,
wherein the mass section is configured to vibrate along the third axis, and
the plurality of drive coupling sections are configured to prevent a vibration of the mass section in a direction along the first axis from transferring to the detection section via the support body.

12. The electronic device according to claim 11, wherein the functional element further includes a base body,
wherein the detection section includes
a detecting movable electrode extending from the support body along the second axis, and
a detecting stationary electrode, which is opposed to the detecting movable electrode, extends along the second axis, and is supported by the base body.

13. The electronic device according to claim 11, wherein two of the plurality of drive coupling sections are disposed side by side along the first axis.

14. The electronic device according to claim 11, wherein the plurality of drive coupling sections include a first drive coupling section and a second drive coupling section,
the second coupling end of the first part of the first drive coupling section is connected to the first mass end of the mass section, and the second coupling end of the first part of the second drive coupling section is connected to the second mass end of the mass section on an opposite side to the first mass end.

15. The electronic device according to claim 11, wherein the plurality of drive coupling sections are configured to satisfy a relationship of (a spring constant in the direction along the third axis)<(a spring constant in the direction along the first axis).

16. A moving object comprising:
a functional element, the functional element including:
a support body;
a detection section that is connected to the support body and that is configured to detect a vibration in a direction along a first axis, the detection section having a first detection end and a second detection end opposite to the first detection end, the first axis being perpendicular to second and third axes, the second axis being perpendicular to the third axis;
a plurality of drive coupling sections, each of the plurality of drive coupling sections being configured with a first part and a second part which is directly connected to the first part, the first part extending along the first axis, the first part having first and second coupling ends opposite to each other, the second part extending along the second axis, wherein the first coupling ends of the first parts are connected to the first and second detection ends of the detection section; and
a mass section connected to the support body via the plurality of drive coupling sections, the mass section having a first mass end and a second mass end opposite to the first mass end, the second coupling ends of the first parts being connected to the first and second mass ends; and
a movable body that houses the functional element,
wherein the mass section is configured to vibrate along the third axis, and
the plurality of drive coupling sections are configured to prevent a vibration of the mass section in a direction along the first axis from transferring to the detection section via the support body.

17. The moving object according to claim 16, wherein the functional element further includes a base body;
wherein the detection section includes
a detecting movable electrode extending from the support body along the second axis, and
a detecting stationary electrode, which is opposed to the detecting movable electrode, extends along the second axis, and is supported by the base body.

18. The moving object according to claim 16, wherein two of the plurality of drive coupling sections are disposed side by side along the first axis.

19. The moving object according to claim 16, wherein the plurality of drive coupling sections include a first drive coupling section and a second drive coupling section,
the second coupling end of the first part of the first drive coupling section is connected to the first mass end of the mass section, and
the second coupling end of the first part of the second drive coupling section is connected to the second mass end of the mass section on an opposite side to the first mass end.

20. The moving object according to claim 16,
wherein the plurality of drive coupling sections are configured to satisfy a relationship of (a spring constant in the direction along the third axis)<(a spring constant in the direction along the first axis).

* * * * *